United States Patent
Nguyen et al.

(10) Patent No.: US 11,507,195 B2
(45) Date of Patent: *Nov. 22, 2022

(54) AUGMENTED REALITY INTERACTION TECHNIQUES

(71) Applicant: Rockwell Automation Technologies, Inc., Mayfield Heights, OH (US)

(72) Inventors: Thong T. Nguyen, New Berlin, WI (US); Paul D. Schmirler, Glendale, WI (US); Timothy T. Duffy, Franklin, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 17 days.

This patent is subject to a terminal disclaimer.

(21) Appl. No.: 17/184,254

(22) Filed: Feb. 24, 2021

(65) Prior Publication Data

US 2021/0181856 A1   Jun. 17, 2021

Related U.S. Application Data

(63) Continuation of application No. 16/143,087, filed on Sep. 26, 2018, now Pat. No. 10,942,577.

(51) Int. Cl.
*G06T 19/00* (2011.01)
*G06F 3/01* (2006.01)
(Continued)

(52) U.S. Cl.
CPC .............. *G06F 3/017* (2013.01); *G06F 1/163* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS 9,619,941 B2    4/2017   Ueno et al.
10,163,001 B2   12/2018  Kim et al.
(Continued)

OTHER PUBLICATIONS

European Examination Report for EP Application No. 19198602.5-1216, dated Jul. 14, 2021, 10 pages.
(Continued)

*Primary Examiner* — Nicholas R Wilson
(74) *Attorney, Agent, or Firm* — Fletcher Yoder, P.C.

(57) ABSTRACT

A method may include receiving, via a processor, image data associated with a user's surrounding and generating, via the processor, a visualization that may include a virtual industrial automation device. The virtual industrial automation device may depict a virtual object within image data, and the virtual object may correspond to a physical industrial automation device. The method may include displaying, via the processor, the visualization via an electronic display and detecting, via the processor, a gesture in image data that may include the user's surrounding and the visualization. The gesture may be indicative of a request to move the virtual industrial automation device. The method may include tracking, via the processor, a user's movement, generating, via the processor, a visualization that may include an animation of the virtual industrial automation device moving based on the user's movement, and displaying, via the processor, the visualization via the electronic display.

20 Claims, 14 Drawing Sheets

(51) Int. Cl.
    *G06F 3/04815*     (2022.01)
    *G06F 3/04842*     (2022.01)
    *G06T 13/20*     (2011.01)
    *G06F 1/16*     (2006.01)
    *G06F 3/04845*     (2022.01)
    *G06F 3/0482*     (2013.01)

(52) U.S. Cl.
    CPC ........ *G06F 3/0482* (2013.01); *G06F 3/04815* (2013.01); *G06F 3/04842* (2013.01); *G06F 3/04845* (2013.01); *G06T 13/20* (2013.01); *G06T 19/006* (2013.01)

(56) References Cited

U.S. PATENT DOCUMENTS

| | | |
|---|---|---|
| 2011/0261083 A1 | 10/2011 | Wilson |
| 2014/0104274 A1 | 4/2014 | Hilliges et al. |
| 2014/0160001 A1 | 6/2014 | Kinnebrew et al. |
| 2015/0153833 A1 | 6/2015 | Pinault et al. |
| 2015/0187357 A1 | 7/2015 | Xia et al. |
| 2016/0026253 A1 | 1/2016 | Bradski et al. |
| 2017/0076500 A1 | 3/2017 | Maggiore et al. |
| 2017/0270715 A1 | 9/2017 | Lindsay et al. |
| 2018/0131907 A1* | 5/2018 | Schmirler .......... H04N 5/23238 |
| 2018/0136721 A1 | 5/2018 | Alleaume et al. |
| 2019/0073827 A1 | 3/2019 | Coronado et al. |
| 2019/0087011 A1 | 3/2019 | Kim et al. |

OTHER PUBLICATIONS

Skullfit, "Puzzle & Treasure hunt with your body", YouTube, Feb. 3, 2018, 1 page, :29 seconds, https://www.youtube.com/watch?v=GZMH7sLA3pk&t=25s.

Extended European Search Report for EP Application No. 19198602.5-1216 dated Jan. 29, 2020.

Summons to Attend Oral Proceedings Rule 115(1) EPC, EP ref. No. EP124767, dated Jun. 29, 2022, 9 pages.

S.K. Ong, et al., "Augmented Assembly Technologies Based on 3D Bare-Hand Interaction," CIRP Annals Manufacturing Technology, 60 (2011), pp. 1-4.

* cited by examiner

AUGMENTED REALITY INTERACTION TECHNIQUES

CROSS-REFERENCE TO RELATED APPLICATIONS

This is a continuation application of U.S. patent application Ser. No. 16/143,087, entitled "AUGMENTED REALITY INTERACTION TECHNIQUES", filed on Sep. 26, 2018, which is incorporated by reference herein in its entirety for all purposes.

BACKGROUND

The disclosure relates generally to the design of industrial systems. More particularly, embodiments of the present disclosure are related to systems and methods for detecting user input within an augmented reality environment and displaying or modifying visualizations associated with an industrial automation device or an industrial system based on the detected user input.

Augmented reality (AR) devices provide layers of computer-generated content superimposed on a visualization of a real-world environment to a user via a display. That is, an AR environment may provide a user with a combination of real-world content and computer-generated content. Augmented reality devices may include, for example, a head mounted device, smart glasses, a virtual retinal display, a contact lens, a computer, or a hand-held device, such as a mobile phone or a tablet. As AR devices become more widely available, these devices may be used to assist operators in industrial automation environments to perform certain tasks. As such, it is recognized that improved systems and methods for perform certain operations in the AR environment may better enable the operators to perform their job functions for efficiently.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for interacting with virtual objects in an augmented reality environment may include a head mounted device. The head mounted device may receive a first set of image data associated with a surrounding of a user and generate a first visualization comprising a plurality of virtual compartments. Each virtual compartment may be associated with one type of virtual industrial automation device and each virtual compartment may include a plurality of virtual industrial automation devices. Each virtual industrial automation device may depict a virtual object within the first set of image data and the virtual object may correspond to a physical industrial automation device. The head mounted device may display the first visualization via an electronic display and detect a gesture in a second set of image data that may include the surrounding of the user and the first visualization. The gesture may be indicative of a selection of one of the plurality of virtual compartments. The head mounted device may generate a second visualization comprising a respective plurality of virtual industrial automation devices associated with the selection and display the second visualization via the electronic display.

In another embodiment, a method may include receiving, via a processor, a first set of image data associated with a surrounding of a user and generating, via the processor, a first visualization comprising a virtual industrial automation device. The virtual industrial automation device may be configured to depict a virtual object within the first set of image data and the virtual object may correspond to a physical industrial automation device. The method may include displaying, via the processor, the first visualization via an electronic display and detecting, via the processor, a gesture in a second set of image data that may include the surrounding of the user and the first visualization. The gesture may be indicative of a request to move the virtual industrial automation device. The method may include tracking, via the processor, a movement of the user, generating, via the processor, a second visualization that may include an animation of the virtual industrial automation device moving based on the movement, and displaying, via the processor, the second visualization via the electronic display.

In yet another embodiment, a computer-readable medium may include computer-executable instructions that, when executed, may cause a processor to receive a first set of image data associated with a surrounding of a user and generate a first visualization that may include a first virtual industrial automation device and a second virtual industrial automation device. The first and second virtual industrial automation devices may depict first and second respective virtual objects within the first set of image data, and the first and second respective virtual objects may correspond to a first and a second physical industrial automation device. The computer-readable medium may include computer-executable instructions that, when executed, may cause the processor to display the first visualization via an electronic display and detect a first gesture in a second set of image data that may include the surrounding of the user and the first visualization. The first gesture may be indicative of a movement of the first virtual industrial automation device toward the second virtual industrial automation device. The computer-readable medium may include computer-executable instructions that, when executed, may cause the processor to determine a compatibility between the first virtual industrial automation device and the second virtual industrial automation device, generate a second visualization that may include an animation of the first virtual industrial automation device coupling to the second virtual industrial automation device to create a joint virtual industrial automation device in response to determining that the first virtual industrial automation device and the second virtual industrial automation device are compatible, generate a third visualization comprising an error notification in response to determining that the first virtual industrial automation device and the second virtual industrial automation device are incompatible, and display the second visualization or the third visualization via the electronic display.

DRAWINGS

These and other features, aspects, and advantages of the present disclosure may become better understood when the following detailed description is read with reference to the accompanying drawings in which like characters represent like parts throughout the drawings, wherein:

FIG. 1 is a block diagram of an exemplary embodiment of an interactive augmented reality (AR) system that may be utilized to display and interact with a virtual representation of an industrial automation system in an AR environment, in accordance with an embodiment;

FIG. 2 a block diagram of an exemplary display device of the interactive AR system of FIG. 1, in accordance with an embodiment;

DETAILED DESCRIPTION

Figure 1:
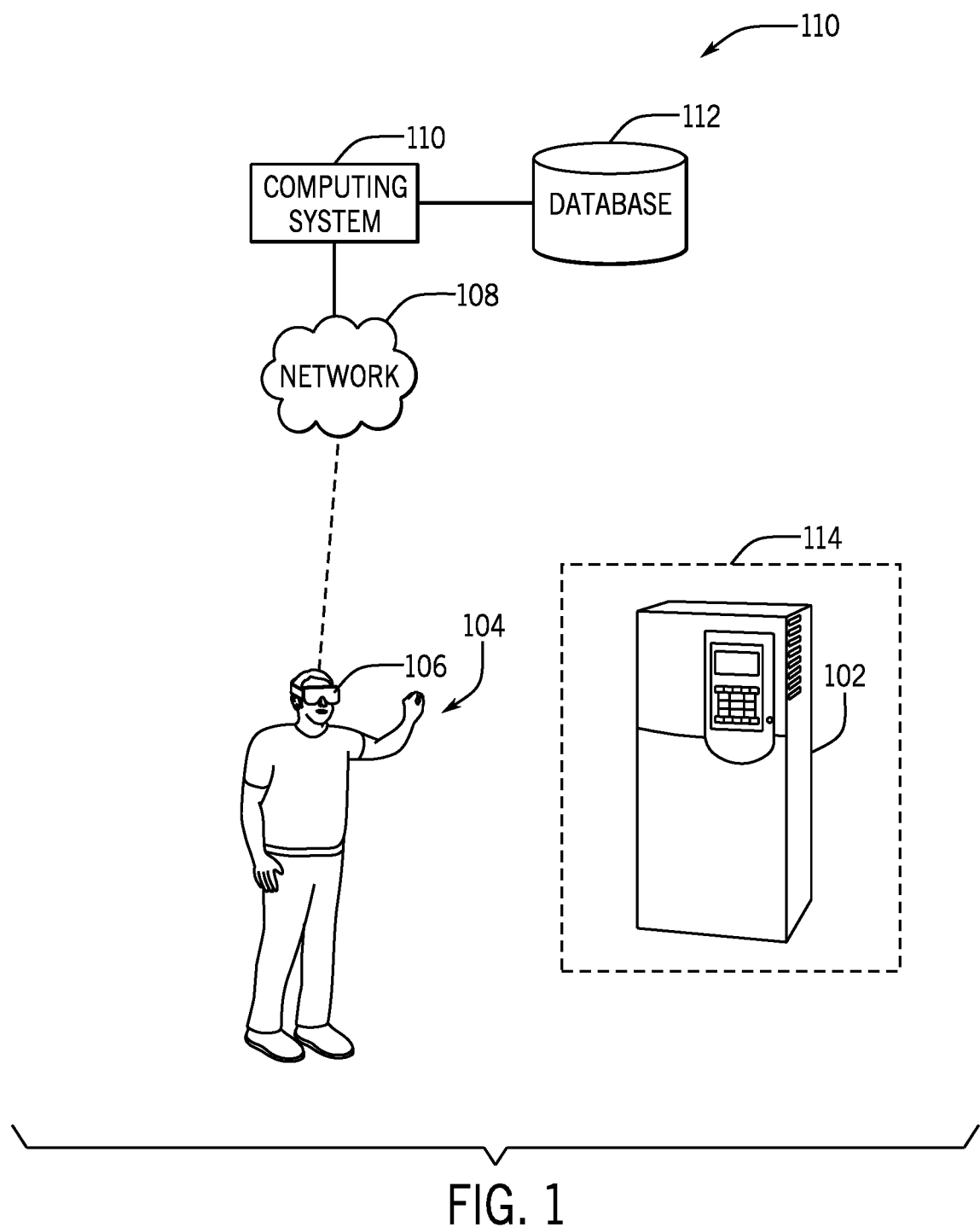

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards an interactive augmented reality (AR) system that may display one or more visualizations of a combination of real-world and computer-generated content in an AR environment to a user and detect various gestures performed by the user that correspond to respective interactions with the real-world and computer-generated content in the AR environment. After detecting a gesture performed by the user, the interactive AR system may modify a visualization associated with the AR environment based on the detected gesture. For example, the interactive AR system may alter the user's perception of the real world by displaying or modifying one or more virtual objects in the visualization associated with the AR environment presented to the user based on the detected gesture. In some embodiments, modifying a visualization or modifying a virtual object in a visualization may include generating an additional visualization and displaying the additional visualization.

Although the AR system is described herein as providing computer-generated content visually, it should be noted that the AR system may provide computer-generated content via other types of sensory modalities. For example, the computer-generated content may be presented to a user via an auditory modality, a haptic modality, a somatosensory modality, an olfactory modality, or the like. Additionally, although the interactive AR system is described herein as providing an AR experience to the user, it should be noted that features of the interactive AR system may be utilized within a virtual reality context or a mixed reality context as well. In one embodiment, the interactive AR system may generate and display a visualization that contains real-world content (e.g., the user's surroundings or portions of the user) and computer-generated content (e.g., virtual objects). In another embodiment, the interactive AR system may have a transparent display and display a visualization of computer-generated content (e.g., virtual objects) superimposed over the transparent display to produce virtual objects within real world surroundings.

In certain embodiments, the interactive AR system may also detect various voice commands that correspond to respective interactions with the computer-generated content in the AR environment. After detecting a voice command generated by the user, the interactive AR system may modify the AR environment based on the detected voice command. In some embodiments, a voice command may correspond to an interaction similar to an interaction associated with a gesture. In this way, the interactive AR system may provide the user with flexible control of the interactive AR system by facilitating the user's control of the interactive AR system in different ways.

For ease of discussion, the description of the interactive AR system provided herein is made with reference to the design of an industrial system. However, it should be noted that the interactive AR system, as described herein, is not limited to such embodiments. The interactive AR system may be used in various other fields and applications. For example, the interactive AR system may be used to formulate possible archaeological site configurations, visualize and design construction models or sites of residential or commercial buildings, underground structures, or offshore wells, visualize and design commercial products or previews of commercial products, such as furniture, clothing, appliances, or vehicles, provide educational material or training, visualize local or remote geographic features, such as cities, forests, or oceans, facilitate social interaction, provide digital game play in a real world environment, provide medical information, such as X-ray, ultrasound, or magnetic resonance imaging (MRI) data, facilitate or visualize toy manufacturing or toy design, or the like.

For an industrial system with many components, it may be beneficial to tailor the design of the industrial system to the real-world environment in which the industrial system may be located after assembly of the industrial system. For example, in an industrial system employing conveyors, such as a high-speed packaging line, the design of the industrial system may be constrained by the physical dimensions or the shape of the building in which the industrial system may be located. Additionally, each conveyor in the industrial system may have a plethora of parts, such as conveyor sections, movers, and the like, that each having a different size and shape. Further, the design of the industrial system may be tailored to the needs of a user of the industrial system. For example, the specific configuration and shape of the conveyors of the industrial system may be based on other components within the industrial system that provide product to the conveyor to transport. As such, it may be beneficial to visualize and design an industrial system within the real-world environment that the industrial system may be located before assembly of the industrial system to optimize the design of the industrial system based on the physical constraints of the location and the needs of the user of the industrial system.

With the foregoing in mind, the interactive AR system may facilitate the visualization and the design of an industrial system by a user within the physical space that the industrial system may be located after assembly. For example, the interactive AR system may display a visualization associated with various virtual industrial automation devices, such as conveyor sections, movers, or the like, to the user in an AR environment, while the user is present in the real-world environment that the actual industrial automation devices may be located after assembly. The interactive AR system may then detect a gesture performed by the user or a voice command issued by the user and modify the visualization based on the detected gesture or the detected voice command. As such, the user may visualize and model various configurations and designs of an industrial system and the components of the industrial system within the physical space the industrial system may be located after assembly.

It should be noted that the gestures and voice commands provided by the user to control the positioning of the virtual objects in the AR environment may be more beneficial for the user if they mimic real world motions. That is, using gestures and movements to move a virtual object in the same manner a person may wish to move a real object may provide for a more desirable interface between the user and the AR environment. For example, the following gestures may be performed by the user to interact with one or more virtual industrial automation devices of an industrial system in an AR environment after the gestures are detected by the interactive AR system. It should be noted that the following gestures are exemplary and non-limiting and that other gestures may be performed that provide similar interactions with the virtual representations as described herein or similar gestures may be performed that provide different interactions with the virtual representations as described herein.

In one embodiment, the interactive AR system may detect a gaze gesture (e.g., viewing an object for certain amount of time) performed by the user to indicate a selection of a virtual industrial automation device or a request for the interactive AR system to display additional information associated with the industrial automation device. For example, after the interactive AR system has detected a gaze gesture performed by the user and directed at a virtual industrial automation device, the interactive AR system may modify a visualization associated with the AR environment to indicate that the virtual industrial automation device has been selected by a user. Such an indication may be represented by a coloring, a shading, a transition of between dotted lines to solid lines, a highlighting, or the like, of the virtual industrial automation device in the visualization associated with the AR environment. After the virtual industrial automation device has been selected by the user in the visualization associated with the AR environment, the user may perform additional gestures as described herein to interact with the virtual industrial automation device further.

In another example, in a design environment, after the interactive AR system has detected a gaze gesture performed by the user and directed at a virtual compartment or category, the interactive AR system may modify a visualization associated with the AR environment to display the contents of the virtual compartment (e.g., one or more virtual industrial automation devices that are associated with the virtual compartment). For example, the virtual compartment may include various types of virtual conveyor sections that may be employed within the design of a conveyor system. After the interactive AR system has detected a gaze feature performed by the user and directed at the virtual compartment, the interactive AR system may modify a visualization associated with the AR environment to display the various types of virtual conveyor sections (e.g., virtual conveyor sections having different shapes, such as a straight section, a U-shaped section, a C-shaped section, or the like).

In another example, after the interactive AR system has detected a gaze gesture performed by the user and directed at a virtual industrial automation device, the interactive AR system may modify a visualization associated with the AR environment to display various types of data associated with the virtual industrial automation device, such as identification data, compatibility data with other virtual industrial automation devices, or the like.

In another embodiment, after the user has selected a virtual industrial automation device, the interactive AR system may detect a grasping gesture performed by the user to map the virtual industrial automation device to the hand of the user that performed the grasping motion. In some embodiments, the interactive AR system may map two respective virtual industrial automation devices to each hand of the user. That is, the interactive AR system may detect a first grasping gesture performed by a user's first hand and map a first virtual industrial automation device to the user's first hand, and the interactive AR system may detect a second grasping gesture performed by the user's second hand and map a second virtual industrial automation device to the user's second hand. After a virtual industrial automation device is mapped to a user's hand, the user may move the virtual industrial automation device within the visualization associated with the AR environment in real-time or approximately in real-time. That is, the interactive AR system may track the movement of the user's hand in the visualization in the AR environment and modify the visualization in response to the movement of the user's hand such that the virtual industrial automation device mapped to user's hand appears in the same location as the user's hand in the visualization.

In yet another embodiment, after the interactive AR system has mapped a virtual industrial automation device to each of the user's hands, the interactive AR system may detect a snap gesture performed by the user that involves the user bringing both of the user's hands together. For example, the snap gesture may involve the user bringing both of the user's hands together while the user is grasping a respective virtual industrial automation device in each hand. After detecting the snap gesture performed by the user, the interactive AR system may modify a visualization associated with the AR environment to couple (e.g., snap) the two virtual industrial automation devices together at one or more predetermined connection points. For example, the interactive AR system may modify the visualization associated with the AR environment to provide a snapping motion between the two virtual industrial automation devices as the two virtual industrial automation devices are coupled together. In one embodiment, the interactive AR system may provide a snapping sound that may accompany the snapping motion displayed via the visualization associated with the AR environment. In another embodiment, the interactive AR system may determine a compatibility between the two virtual industrial automation devices before modifying the visualization associated with the AR environment to snap the devices together. For example, the interactive AR system may display an error message after determining that the two virtual industrial automation devices are not compatible with each other (e.g., the two virtual industrial automation devices may not couple together in the real-world).

After the interactive AR system has mapped a joint virtual industrial automation device (e.g., two or more virtual industrial automation devices that have been coupled together) to the hands of a user, the interactive AR system may detect a separate gesture performed by the user that involves the user pulling both of the user's hands apart. For example, the separate gesture may involve the user separating the user's hands while the user is grasping a different section of the joint virtual industrial automation device. After detecting the separate gesture performed by the user, the interactive AR system may decouple or separate the virtual industrial automation devices grasped by the user. That is, the interactive AR system may modify a visualization associated with the AR environment by displaying a motion that separates the virtual industrial automation devices apart from each other. In some embodiments, the interactive AR system may determine whether the user's hands are positioned about a line or a point of severance between respective virtual industrial automation devices that are coupled together in the joint virtual industrial automation device. For example, the interactive AR system may determine a position of each hand of the user along a joint virtual industrial automation device. The interactive AR system may then determine that a line or a point of severance associated with the joint virtual industrial automation device is located between the positions of each user's hands along the joint virtual industrial automation device. In some embodiments, after detecting that the user has performed a gaze gesture command at a joint virtual industrial automation device, the interactive AR system may determine one or more severance joints between the virtual industrial automation devices in the joint virtual industrial automation device and modify the visualization to display the one or more determined severance joints. After determining that the line or the point of severance is not between the positions of each user's hands along the joint virtual industrial automation device, the interactive AR system may display an error message associated with the determination.

The interactive AR system may also detect a push gesture or a pull gesture performed by the user that involves the user placing one or both hands on a virtual surface of a virtual industrial automation device and the user moving in a certain direction within the visualization associated with the AR environment. For example, the push gesture may involve the user placing both hands on a virtual surface of a virtual industrial automation device and walking in a forward direction relative to the position of the user. Similarly, the pull gesture may involve the user placing both hands on a virtual surface of a virtual industrial automation device and walking in a backward direction relative to the position of the user. After the interactive AR system detects either the push gesture or the pull gesture performed by the user, the interactive AR system may move the virtual industrial automation device in a direction and at a speed that corresponds to the direction and the speed at which the user is moving. That is, the interactive AR system may modify a visualization associated with the AR environment by displaying a continuous movement of the virtual industrial automation device in the direction and the speed at which the user is walking in the AR environment. In this way, the interactive AR system may simulate a pushing action against the virtual surface of the virtual industrial automation device to move the virtual industrial automation device to another position and a pulling action from the virtual surface of the virtual industrial automation device to move the virtual industrial automation device to another position in the visualization associated with the AR environment.

In another embodiment, the interactive AR system may detect a nudge gesture (e.g., movement of hands across some space within a certain amount of time) performed by the user that involves the user placing one hand on a virtual surface of a virtual industrial automation device and the user moving the user's arm or hand in a certain direction within the visualization associated with the AR environment. For example, the nudge gesture may involve the user placing a hand on a virtual surface of the virtual industrial automation device and a movement of the user's hand and/or arm in the forward direction while the user remains standing in place. After the interactive AR system detects the nudge gesture performed by the user, the interactive AR system may move the virtual industrial automation device in the forward direction and at the speed that the user's hand and/or arm are moving. That is, the interactive AR system may modify a visualization associated with the AR environment by displaying a movement of the virtual industrial automation device in the forward direction and at the speed that the user's hand and/or arm are moving. Although the description of the nudge gesture provided above is made in reference to moving the virtual industrial automation device in the forward direction, it should be noted that in other embodiments, the nudge gesture may move the virtual industrial automation device in a left direction, a right direction, a backward direction, a downward direction, an upward direction, or any other suitable direction based on the direction the user's arm and/or hand is moving.

The interactive AR system may also detect a rotate gesture performed by the user that involves the user placing a hand about an axis of rotation of the virtual industrial automation device and twisting the wrist of the user. After the interactive AR system detects the rotate gesture performed by the user, the interactive AR system may rotate the virtual industrial automation device about the axis of rotation of the virtual industrial automation device at a speed and an angle corresponding to the speed and the angle of rotation of the user's wrist. That is, the interactive AR system may modify a visualization associated with an AR environment to display a rotating motion of the virtual industrial automation device in the hand of the user.

As such, the interactive AR system may detect various gestures that a user may perform to assist in the design of an industrial system in an AR environment. The gestures may correspond to respective interactions with one or more virtual industrial automation devices that may be displayed in a visualization associated with the AR environment. In this way, the user may model various configurations of virtual industrial automation devices that a user may include in the design of the industrial system without having to physically move and interact with the actual counterpart devices in the real world. Additionally, by performing one or more of the various gestures described herein, a user of the interactive AR system may interact with the virtual industrial automation devices in a visualization associated with the AR environment in a natural and intuitive manner. That is, the interactive AR system may facilitate a user's interaction with the virtual industrial automation devices in the AR environment similar to how the user would interact with their counterparts in the real world. Additionally, the movement of the virtual industrial automation devices in the AR environment, the interactions of the virtual industrial automation devices with other virtual objects in the AR environment, the interactions of the virtual industrial automation devices with the physical surroundings of the user, or the like, may obey the physical laws of nature and simulate real-world, physical behaviors and actions. Further, the user's interactions with the virtual industrial automation devices may ignore one or more physical laws. For example, the user may move a virtual industrial automation device in the AR environment as though the virtual industrial automation device is weightless and frictionless. In this way, the interactive AR system may facilitate a user's interaction with and movement of a virtual industrial automation device at will and without any encumbrances but may provide a physical simulation of how the physical counterpart device to the virtual device would behave in the real-world.

Additionally, in some embodiments, the interactive AR system may detect voice commands issued by the user to provide similar interactions or additional interactions with a virtual industrial automation device in the AR environment or with the AR environment itself. In some embodiments, for one or more of the gesture-based commands described herein, a corresponding voice command may be issued by the user to perform a similar interaction with one or more virtual industrial automation devices. For example, the user may perform a gaze gesture at a virtual industrial automation device in the AR environment and may say the voice command "grasp." After the interactive AR system detects the gaze gesture and the voice command, the interactive AR system may map the virtual industrial automation device to a hand of the user. In another example, after the interactive AR system maps a joint virtual industrial automation device to a user's hands, the user may say the voice command "separate" to cause the joint virtual industrial automation device to decouple at a point or line of severance between respective virtual industrial automation devices.

In some embodiments, a user may wish to design an industrial system from a remote location away from the physical location that the industrial system may be located after assembly. For example, a user may design an industrial system from an office or in another country. In such embodiments, the interactive AR system may provide an operational mode (e.g., dynamic rotation mode) that facilitates the design of an industrial system in a virtual environment. That is, the interactive AR system may display a visualization associated with a virtual environment that corresponds to a scaled version of the physical location that the industrial system may be located after assembly. The interactive AR system may then facilitate the user's navigation of the visualization associated with the virtual environment by detecting one or more gesture and/or voice commands that correspond to respective navigational tools that the user may employ in the visualization associated with the virtual environment.

Additionally, the interactive AR system may facilitate a user's interaction with various virtual industrial automation devices in the visualization associated with the virtual environment by detecting one or more gestures or voice commands as described herein. For example, the interactive AR system may detect a grasp gesture by a user and map a virtual industrial automation device to the user's hand. In another example, the interactive AR system may issue a voice command to the interactive AR system to "turn right." After the interactive AR system detects the voice command, the interactive AR system may modify a visualization associated with the virtual environment to display a view similar to a view that the user would perceive in the real-world location after the user had turned right from the user's starting position. As such, the interactive AR system may provide the user with a variety of design tools that facilitate a user to flexibly and conveniently design an industrial system.

In some embodiments, the interactive AR system may provide the user with an operational mode (e.g., hover mode) that provides information associated with one or more industrial automation devices in an existing industrial system. That is, the user may be physically located within an industrial system that has already been designed and assembled. The user may perform a gaze gesture or a voice command at an industrial automation device in the industrial system. After the interactive AR system detects the gaze gesture and/or the voice command by the user, the interactive AR system may display identification information, maintenance information, operational information, performance information, or the like, associated with the industrial automation device in a visualization associated with an AR environment. For example, the information associated with the industrial automation device may be superimposed upon or adjacent to the real-world representation of the industrial automation device in the visualization associated with the AR environment.

With this in mind, the presently disclosed embodiments include an interactive AR system that may be used to design an industrial system in an AR environment or provide information associated with industrial automation devices in an existing industrial system. In some embodiments, the interactive AR system may be equipped with one or more image devices that may detect various gestures performed by a user to interact with virtual representations of parts of an industrial system displayed within an AR environment. Additionally, the interactive AR system may be equipped with one or more audio devices that may detect various commands issued by a user to interact with virtual representations of parts of an industrial system within an AR environment or with the AR environment itself. Additional details regarding the interactive AR system and various systems and methods for displaying or modifying a visualization associated with the AR environment are described in more detail with reference to FIGS. 1-21.

By way of introduction, FIG. 1 is a block diagram of an interactive AR system 100 that may be utilized by a user 104 to display a visualization 114 that includes a virtual representation of an industrial automation device 102 (e.g., virtual industrial automation device) in an AR environment. In the illustrated embodiment, the augmented reality (AR) environment may refer to a visualization 114 of a combination of computer-generated and real-world content displayed to a user 104 via a head mounted device 106 of the interactive AR system 100. Although a head mounted device 106 is employed within the illustrated embodiment of the interactive AR system 100, it should be noted that, in other embodiments, other suitable types of displays may be employed by the interactive AR system 100. For example, the interactive AR system 100 may employ smart glasses, a virtual retinal display, one or more contact lenses, a computer, a mobile device, or any other suitable electronic display device for displaying visualizations to a user. In any case, the head mounted device 106 may display a visualization 114 that includes a virtual industrial automation device 102 to the user 104. The visualization 114 may be superimposed computer-generated content (e.g., images or sounds) over real-world content (e.g., images or sounds) of the user's environment in real-time. Additional details with regard to the head mounted device 106 may be discussed below with reference to FIG. 2.

In the illustrated embodiment, the interactive AR system 100 may display a visualization 114 via the head mounted device 106 that includes a virtual representation of a motor drive 102. However, it should be noted that the illustrated embodiment is intended to be non-limiting and that the interactive AR system 100 may display a visualization 114 via the head mounted device 106 that may include other virtual industrial automation devices, or parts thereof, that may be employed within an industrial system. For example, the industrial automation devices may include controllers, input/output (I/O) modules, motor control centers, motors, valves, actuators, temperature elements, pressure sensors, human machine interfaces (HMIs), operator interfaces, contactors, starters, sensors, drives, relays, protection devices, switchgear, compressors, network switches (e.g., Ethernet switches, modular-managed, fixed-managed, service-router, industrial, unmanaged, etc.), data centers, conveyor sections, movers, and the like.

In certain embodiments, the head mounted device 106 of the interactive AR system 100 may detect a gesture command performed by a user 104. For example, the interactive AR system 100 may detect a gaze gesture performed by the user 104 directed at a virtual industrial automation device 102 to request information or data associated with the industrial automation device 102. The head mounted device 106 may analyze characteristics of image data associated with the user's biomechanical movements to determine if the image data matches a characteristic of a gesture command stored, learned, or otherwise interpretable by the head mounted device 106 of the interactive AR system 100. Image data associated with the user's biomechanical movements may include the motion, or lack thereof, of the user's hands, wrists, arms, fingers, or any other suitable body part to distinguish one gesture command from another gesture command. In some embodiments, the head mounted device 106 may acquire the image data and send the image data, via network 108, to a computing system 110 to analyze the characteristics of the image data to determine if the image data matches a characteristic of a gesture command stored, learned, or otherwise interpretable by the computing system 110.

In some embodiments, the head mounted device 106 may be communicatively coupled to one or more motion sensors attached to a user's body. For example, one or more motion sensors may be disposed on the user's hands, wrists, arms, fingers, legs, feet, torso, or any other suitable body part and provide motion data (e.g., body motion capture data) to the head mounted device 106. In one embodiment, based on the received motion data associated with the user 104, the head mounted device 106 may analyze the motion data associated with a respective body part of the user 104 and determine a gesture command stored, learned, or otherwise interpretable by the head mounted device 106. In another embodiment, the head mounted device 106 may analyze the motion data associated with the respective body part of the user 104 and determine a virtual force (e.g., a virtual speed, virtual displacement, or virtual direction) associated with a gesture command performed by the user. For example, the head mounted device 106 may determine a speed and an angle associated with the movement of the user's hand or foot after the user 104 performs a push gesture command against a virtual industrial automation device. The head mounted device 106 may then modify a visualization 114 to display an animation of a movement of the virtual industrial automation device based on the determined speed and angle associated with the movement of the user's hand or foot.

In the illustrated embodiment, the computing system 110 may be communicatively coupled to a database 112 that may store a list of gesture commands that are learned or otherwise interpretable by the head mounted device 106 and/or the computing system 110. The database 112 may also store a list of user profiles that include gesture commands that may correspond to specific users 104 that are learned or otherwise interpretable by the head mounted device 106 and/or the computing system 110. For example, the head mounted device 106 and/or the computing system 110 may retrieve a user profile that includes a list of gesture commands that corresponds to the specific user 104 utilizing the head mounted device 106. The head mounted device 106 and/or the computing system 110 may analyze characteristics of the image data to determine if the image data matches a characteristic of the received gesture commands of the user 104. In some embodiments, if a threshold of one or more characteristics for a gesture command or a verbal command match a stored, learned, or otherwise interpretable gesture command, the head mounted device 106 and/or the computing system 110 may determine that a gesture command has been performed by the user 104 of the head mounted device 106 based on the image data.

It should be noted that any suitable network may be employed in the embodiments described herein. For instance, the network 108 may include any wired or wireless network that may be implemented as a local area network (LAN), a wide area network (WAN), and the like. Indeed, other industrial communication network protocol, such as EtherNet/IP, ControlNet, DeviceNet, and the like, may also be used. In any case, the network 108 may permit the exchange of data in accordance with a protocol.

After detecting a gesture performed by the user 104, the head mounted device 106 of the interactive AR system may request information or data associated with a virtual industrial automation device 102 from the computing system 110 communicatively coupled to the head mounted device 106 via the network 108. The computing system 110 may then send a request to a database 112 communicatively coupled to the computing system 110 for the information or the data associated with the industrial automation device 102. In some embodiments, the computing system 110 and the database 112 may be part of the same device. Additionally, it should be noted that the computing system 110 may be any suitable computing device that includes communication abilities, processing abilities, and the like. For example, the computing system 110 may be any general computing device that may communicate information or data to the head mounted device 106 via the network 108.

The type of information or data associated with the industrial automation device 102 and requested by the head mounted device 106 may be based on the gesture performed by the user 104 and detected by the head amounted device 106. In one embodiment, the head mounted device 106 may detect a gesture command (e.g., a gaze gesture) performed by a user 104 to select a virtual industrial automation device 102 to further interact with (e.g., move, rotate, scale up, or scale down) in a visualization 114 associated with the AR environment. The head mounted device 106 may send a request to the computing system 110 for specification data associated with the virtual industrial automation device 102. For example, the specification data may include a virtual physics dataset associated with the industrial automation device 102. For example, the virtual physics dataset may include a virtual weight of the industrial automation device 102, virtual dimensions of the industrial automation device 102, and the like.

After receiving the virtual physics dataset associated with the industrial automation device 102, the head mounted device 106 may simulate the real-world physical characteristics of the industrial automation device 102 in the visualization 114 associated with the AR environment via the virtual industrial automation device 102. The specification data may also include other visual data associated with the industrial automation device 102, such as possible color schemes, or the like. As such, the head mounted device may receive specification data associated with the virtual industrial automation device 102 from the computing system 110. Based on the received specification data, the head mounted device 106 may generate and display a virtual industrial automation device 102 in the visualization 114 associated with the AR environment to the user 104.

In another embodiment, the user 104 may utilize the head mounted device 106 to obtain operational data or maintenance data regarding the industrial system. After the head mounted device 106 of the interactive AR system 100 detects a gesture command (e.g., a gaze gesture command) performed by the user 104 to select at an actual industrial automation device in the industrial system, the head mounted device 106 may request various types of data (e.g., identification data, operational data, or maintenance data) associated with the industrial automation device 102 from the computing system 110 to display to a user in a visualization 114 associated with the AR environment. For example, the identification data may include a product name, a product type, a vendor name, a cost, a description of the function of the industrial automation device, or the like. The operational data may include data gathered by one or more sensors in the industrial system that measure one or more operational parameters associated with the industrial automation device 102. The maintenance data may include data associated with maintenance records and/or data logs of the industrial automation device 102. As such, the head mounted device 106 may receive various types of data associated with a real-world industrial automation device in an industrial system from the computing system 110 and display the data to the user 104 in a visualization 114 associated with the AR environment.

In another embodiment, the user 104 may perform a gesture command (e.g., a gaze gesture command) to select a virtual industrial automation device 102 when designing an industrial system to obtain identification information associated with the industrial automation device 102. For example, after the head mounted device 106 of the interactive AR system 100 detects a gaze gesture performed by the user 104 and directed at the virtual representation of the industrial automation device 102, the head mounted device 106 may request identification data associated with the industrial automation device 102 from the computing system 110 to display to the user 104 in the visualization 114 associated with the AR environment. For example, the identification data may include a product name, a product type, a vendor name, a cost, a description of the function of the industrial automation device, or the like. As such, the head mounted device 106 may receive identification data associated with a virtual industrial automation device 102 from the computing system 110 and display the identification data to user in the visualization 114 associated with the AR environment.

In another embodiment, the user 104 may perform a snap gesture command to couple a first virtual industrial automation device and a second virtual industrial automation device together. After the head mounted device 106 of the interactive AR system 100 detects the snap gesture by the user 104, the head mounted device 106 may request compatibility data associated with the first virtual industrial automation device and the second virtual industrial automation device from the computing system 110. For example, the compatibility data may include a first list of devices that are compatible with the first industrial automation device and a second list of devices that are compatible with the second industrial automation device. As such, the head mounted device 106 may receive compatibility data associated with the industrial automation device 102 from the computing system 110. Based on the received compatibility data, the head mounted device 106 may then determine whether the first industrial automation device and the second industrial automation device are compatible and display a notification associated with the determination.

As described above, the head mounted device 106 may request information or data associated with an industrial automation device 102 from the computing system 110 that is communicatively coupled to the database 112. The database 112 may be organized to include a list of various industrial automation devices that may be employed in the design of an industrial system. In some embodiments, the database 112 may index the data associated with the industrial automation device 102 based on an identifier associated with each industrial automation device 102. In such embodiments, the head mounted device 106 may identify an identifier of an industrial automation device 102 based on the gesture command or voice command performed by the user 104 and data associated with the industrial automation device 102. The head mounted device 106 may then send a request with the identifier associated with the industrial automation device 102 to the computing system 110. The computing system 110 may then extract data associated with the industrial automation device 102 based on the identifier and/or the type of request and send the extracted data to the head mounted device 106. After the head mounted device 106 receives the data associated with the industrial automation device 102, the head mounted device 106 may generate and display a visualization 114 that includes a visual representation of the data associated with the industrial automation device 102.

Figure 2:
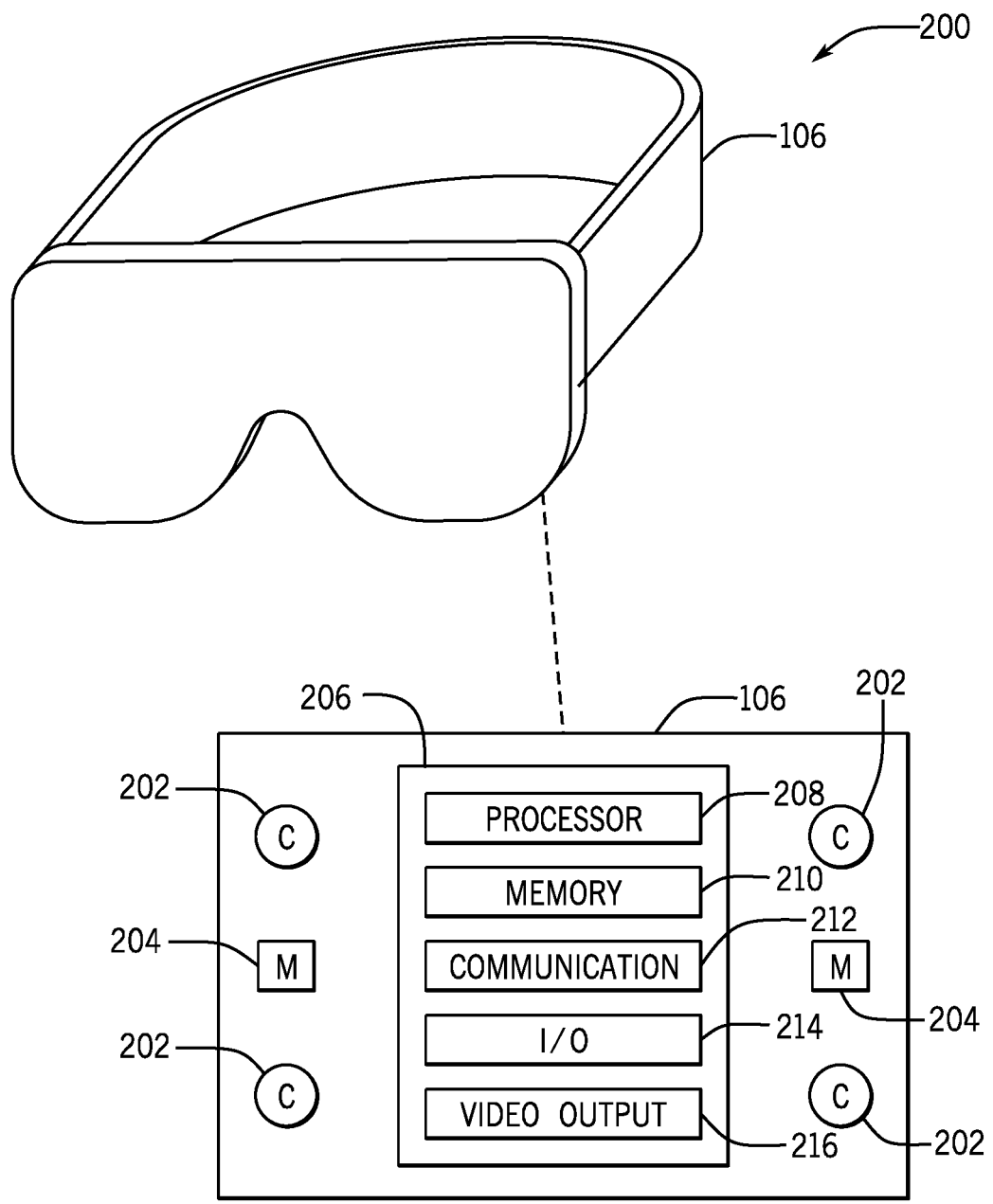

To perform some of the actions set forth above, the head mounted device 106 may include certain components to facilitate these actions. FIG. 2 is a block diagram 200 of exemplary components within the head mounted device 106. For example, the head mounted device 106 may include one or more cameras 202 and one or more microphones 204. It should be understood that any suitable image-receiving device may be used in place of, or in addition to, the cameras 202, for example, a singular camera 202 may be incorporated into the head mounted device 106. It also should be understood that any suitable sound-receiving device may be used in place of, or in addition to, the microphones 204, for example, a combined speaker and microphone device, or a singular microphone 204 may be incorporated into the head mounted device 106.

In some embodiments, the head mounted device 106 may include one or more sensors for detecting the movements of the user 104, the biometrics of the user 104, the surroundings of the user 104, or the like. For example, the head mounted device 106 may include an infrared sensor, a thermal sensor, a range sensor (e.g., a range camera), a smell sensor (e.g., an electronic nose), or any other suitable sensors for detecting characteristics of the user 104 or the surroundings of the user 104.

The head mounted device 106 may also include processing circuitry 206 including a processor 208, a memory 210, a communication component 212, input/output (I/O) ports 214, and the like. The communication component 212 may be a wireless or a wired communication component that may facilitate communication between the head mounted device 106 and the computing system 110, the database 112, and the like via the network 108. This wired or wireless communication protocols may include any suitable communication protocol include Wi-Fi, mobile telecommunications technology (e.g., 2G, 3G, 4G, LTE), Bluetooth®, near-field communications technology, and the like. The communication component 212 may include a network interface to enable communication via various protocols such as EtherNet/IP®, ControlNet®, DeviceNet®, or any other industrial communication network protocol.

The processor 208 of the head mounted device 106 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 208 may, in some embodiments, include multiple processors. The memory 210 may include any suitable articles of manufacture that serve as media to store processor-executable code, data, and the like. The memory 210 may store non-transitory processor-executable code used by the processor 208 to perform the presently disclosed techniques.

Generally, the head mounted device 106 may receive image data or audio data related to a user 104 via one or more image sensors (e.g., cameras 202) or one or more audio sensors (e.g., microphones 204), respectively, communicatively coupled to one or more of the I/O ports 214. Upon receiving image data or audio data, the head mounted device 106, via the processor 208, may interpret the image data or the audio data to determine commands or actions for the head mounted device 106 to perform in response to the determined commands or actions. In some embodiments, the determined command may be forwarded to computing system 110 to interpret the detected image data or audio data. The computing system 110 may analyze characteristics of the image data or the audio data to determine if the image data or the audio data matches the characteristic of a gesture command or verbal command, respectively, stored, learned or otherwise interpretable by the computing system 110.

As mentioned above, the database 112 may store a list of gesture commands or voice commands that are stored, learned, or otherwise interpretably by the computing system 110. For example, the list of gesture or voice commands may include a snap gesture command, a separate gesture command, a push gesture command, a pull gesture command, a rotate gesture command, a nudge gesture command, a lift gesture command, a let-go gesture command, a grasp gesture command, a gaze gesture command, a scale up gesture command, a scale down gesture command, or the like. In another embodiment, instead of forwarding the command to the computing system 110, the head mounted device 106 may be able to analyze characteristics of the image data or the audio data to determine if the image data or the audio data matches the characteristic of a gesture command or verbal command, respectively, stored, learned, or otherwise interpretable by the head mounted device 106. In any case, the head mounted device 106 or the computing system 110 may analyze characteristics of the user's movements in the image data such as the motion of the user's hands, wrists, arms, fingers, or any other suitable body part to distinguish one gesture command from another gesture command.

Additionally, the head mounted device 106 or the computing system 110 may analyze characteristics of the audio data, such as frequency (e.g., pitch), amplitude (e.g., loudness), or any other suitable characteristic used to distinguish one verbal command from another verbal command. If a threshold of one or more characteristics for a gesture command or a verbal command match a stored, learned, or otherwise interpretable command, the head mounted device 106 may determine a command to be performed by the head mounted device 106 based on the image data or the audio data.

As discussed above, the head mounted device 106 may be communicatively coupled to the network 108, which may include an Internet connection, or otherwise suitable wireless or wired communicative coupling to expand its interpretation and functional capabilities, but, in some embodiments, the head mounted device 106 may not rely on such a communicative coupling. In other words, the head mounted device 106 may have particular capabilities that may function without an Internet, wireless, or wired connection. For example, the head mounted device 106 may perform local command interpretation without an Internet or wireless connection.

The head mounted device 106 may also include a video output 216. The video output 216 may be any suitable image-transmitting component, such as a display. Head mounted device 106 may display a visualization 114 associated with the AR environment that combines computer-generated content, such as a virtual industrial automation device 102, with real-world content, such as image data associated with the user's physical surroundings.

Figure 3:
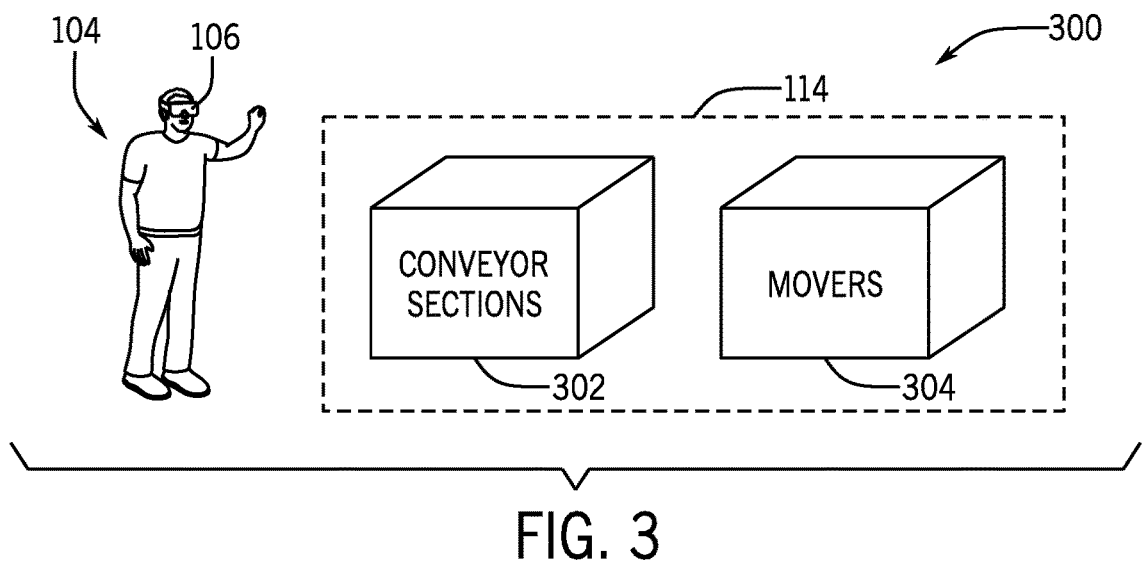
FIG. 3 is a perspective view of an exemplary visualization that may be perceived by a user utilizing the display device of FIG. 2 before the performance of a first gaze gesture command, in accordance with an embodiment.

With the foregoing in mind, FIG. 3 illustrates a perspective view 300 of a user 104 utilizing a head mounted device 106 to perceive the visualization 114 associated with an AR environment. By way of example, in the illustrated embodiment, the user 104 may design a conveyor system for an industrial system. The head mounted device 106 of the interactive AR system 100 may generate and display to the user 104 a visualization 114 with virtual representations of various compartments 302, 304 (e.g., virtual compartments) that each correspond to a type or a category of industrial automation device that may be employed by a conveyor system. For example, the head mounted device 106 may acquire image data of the user and the user's physical surroundings (e.g., the real world) and generate and display a visualization 114 that superimposes the virtual compartments 302, 304 over portions of the acquired image data of the real world in real-time or substantially real-time. In some embodiments, the virtual compartments 302 may resemble real-world objects, such as boxes, storage bins, lockers, or the like, or may have a design that is not directly tied to a real-world object.

As described above, the virtual compartments 302, 304 may correspond to respective types or categories of industrial automation devices that may be employed within a conveyor system. For example, compartment 302 may correspond to different types of conveyor sections that may be employed within a conveyor system. In another example, compartment 304 may correspond to different types of movers that may be employed within a conveyor system. The user 104 may interact with the compartments 302, 304 by performing a gaze gesture command directed at one of the compartments 302, 304 to open.

In some embodiments, a gaze gesture command may be detected by the head mounted device 106 by tracking the movement of the user's eyes associated with a virtual surface of a virtual object (e.g., a virtual compartment or a virtual industrial automation device). For example, the head mounted device 106 may continuously or intermittently acquire image data of the user's eyes and track a location on the display that the user's eyes are focusing on (e.g., a virtual object). In other embodiments, a visual indicator (e.g., dot) displayed in the visualization 114 may correspond to a cursor that the user 104 may use to focus a gesture command on within the visualization 114 associated with the AR environment. For example, the user may change the position of the dot by moving the user's head left, right, up, or down. Once the cursor is positioned on a certain object for greater than a threshold period of time (e.g., greater than 3 seconds, 4 seconds, 5 seconds, or the like), the head mounted device 106 may detect that the user has performed a gaze gesture command to select the object within the visualization 114 associated with the AR environment.

Figure 4:
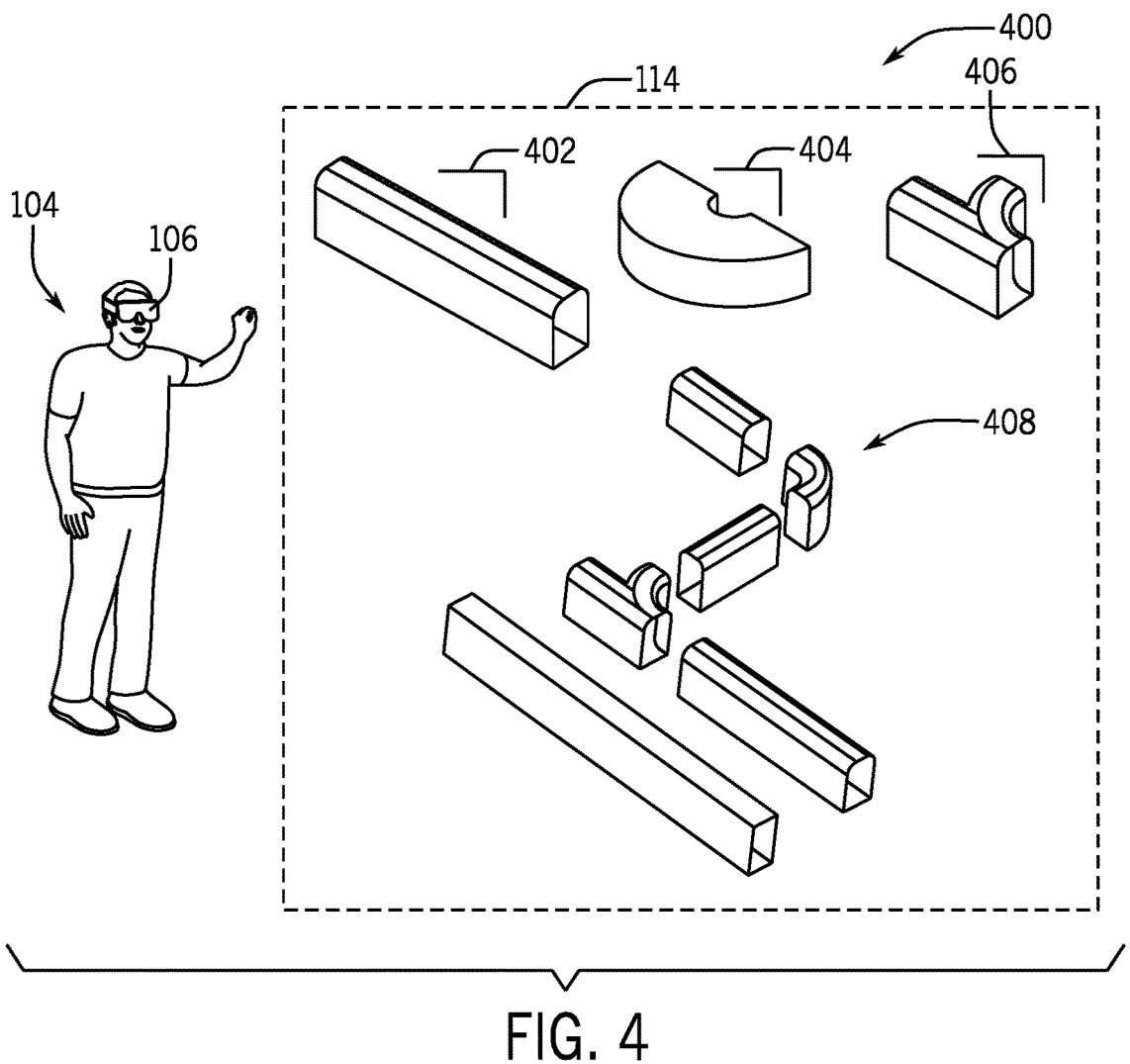
FIG. 4 is a perspective view of an exemplary visualization that may be perceived by the user utilizing the display device of FIG. 2 after a performance of the first gaze gesture command perform a second gaze gesture command, in accordance with an embodiment.

In any case, after the head mounted device 106 has detected that the user 104 has performed a gaze gesture command directed at a virtual compartment 302, 304, the head mounted device 106 may modify the visualization 114 to display one or more virtual industrial automation devices corresponding to the virtual compartment selected by the user 104 via the gaze gesture command. To help illustrate, FIG. 4 illustrates a perspective view 400 of the user 104 utilizing the head mounted device 106 to perceive a modified visualization 114 associated with the AR environment illustrated in FIG. 3. In the illustrated embodiment, the head mounted device 106 of the interactive AR system 100 may display one or more types of virtual conveyor sections 402, 404, 406. For example, virtual conveyor section 402 may have a curved shape, virtual conveyor section 404 may have a straight shape, and virtual conveyor section 406 may have a straight shape and a curved shape.

Although FIGS. 3 and 4 illustrate that the head mounted device 106 may display two virtual categorical compartments 302, 304 of virtual industrial automation devices with a category having three types 402, 404, 406 of a particular industrial automation device, it should be noted that in other embodiments, the virtual categorical compartments and the virtual industrial automation devices in each category are not limited as such in number. In some embodiments, the head mounted device 106 may display any number of virtual compartments 302, 304 and/or virtual industrial automation devices 402, 404, 406 in the visualization 114 associated with the AR environment. For example, the head mounted device 106 may display one, two, five, ten, twenty, fifty, one hundred, or any other suitable number of virtual compartments and/or virtual industrial automation devices in the visualization 114 associated with the AR environment. In some embodiments, the user 104 may look or tilt the user's head to the left, right, up, down, or the like, and the head mounted device 106 may display additional virtual compartments and/or virtual industrial automation devices in the visualization 114 associated with the AR environment accordingly. In one embodiment, the user 104 may resize the virtual compartments and/or virtual industrial automation devices in the visualization 114 such that the available virtual compartments and/or virtual industrial automation devices for display to the user 104 may accommodate the user's visual needs. For example, the user 104 may perform a gesture command (e.g., scale down) or a voice command (e.g., say "scale down") to decrease the size of the virtual compartments and/or virtual industrial automation devices in the visualization 114 such that the user 104 may be able to view and select from tens of options, hundreds of options, thousands of options, or the like, without the user 104 having to look in a different direction or turn the user's head in a different direction to view additional virtual compartments and/or virtual industrial automation devices in the visualization 114.

In another embodiment, the head mounted device 106 may modify the visualization 114 associated with the AR environment and display additional and/or different virtual compartments and/or virtual industrial automation devices as the user 104 moves through the user's surroundings. For example, the head mounted device 106 may display a first subset of virtual industrial automation devices in the visualization 114 associated with the AR environment to the user 104 while the user is in a first position in the user's surroundings. After the head mounted device 106 determines that the user 104 has moved to a second position (e.g., greater than a certain threshold associated with displaying one or more additional virtual industrial automation devices), the head mounted device 106 may display a second subset of virtual industrial automation devices in the visualization 114 associated with the AR environment. In another embodiment, the first subset of the virtual industrial automation devices and the second subset of virtual industrial automation devices may be displayed to the user 104 while the user is in the first position but the second subset of virtual industrial automation devices may be displayed in a proportional smaller size with respect to the first subset of virtual industrial automation devices to simulate that the second subset is further away from the user 104 in the AR environment. As the user 104 moves toward the second subset of the virtual industrial automation devices in the AR environment, the head mounted device 106 may modify the visualization 114 to display the second subset of the virtual industrial automation devices increasing in size as the user walks toward the second subset and the first subset of the virtual industrial automation devices decreasing in size as the user 104 walks away from the first subset. That is, the head mounted device 106 may modify the visualization 114 to simulate the perspective of the user 104 walking away from or toward various real-world industrial automation devices in the user's surroundings.

In other embodiments, the number of virtual compartments 302, 304 and/or the number of virtual industrial automation devices 402, 404, 406 that may be displayed to a user 104 in the visualization 114 may be limited by the area of the display of the visualization 114. For example, the number of virtual compartments 302, 304 or the number of virtual industrial automation devices 402, 404, 406 that may be displayed by the head mounted device 106 in the visualization 114 of the AR environment may be more than two, more than five, more than ten, more than twenty, or the like, based on the size of the virtual compartments 302, 304 or the virtual industrial automation devices 402, 404, 406 in the visualization 114 and the display area of the visualization 114.

In some embodiments, the head mounted device 106 may display a subset of the number of virtual compartments 302, 304 or a subset of the number of virtual industrial automation devices 402, 404, 406 based on the space available via the visualization 114. For example, the head mounted device 106 may display a visualization 114 with four of twenty virtual compartments 302, 304 that correspond to respective types of virtual industrial automation devices 402, 404, 406. The user may then perform a gesture command or issue a voice command to that may cause the head mounted device 106 to modify the visualization 114 to display the next four virtual compartments 302, 304 of the twenty virtual compartments 302, 304. For example, the head mounted device 106 may detect a swiping gesture command (e.g., hand swiping across the virtual compartments 302, 304) performed by the user 104 to display the next subset of virtual compartments 302, 304. In another example, the head mounted device 106 may detect a "next" voice command issued by the user to display the next subset of virtual compartments 302, 304. In another example, the number of virtual compartments 302, 304 displayed in the visualization 114 may not be limited by the display area of the visualization 114. That is, the head mounted device 106 may display additional virtual compartments 302, 304 after detecting that the user has turned the user's head upward, downward, to the left, to the right, and so forth.

Referring back to FIG. 4, the head mounted device 106 may also display a virtual representation of the conveyor system 408 (e.g., a virtual conveyor system) that has been designed or partially designed by the user 104. For example, the virtual conveyor system 408 may include one or more conveyor shapes that have been placed by the user in a specific configuration in the visualization 114 associated with the AR environment. The user 104 may be able to determine a desired shape of conveyor section 402, 404, 406 to employ in the design of the conveyor system 408 based on the display of the virtual conveyor system 408. For example, the user 104 may be able to determine that the specific configuration of the virtual conveyor system 408 is missing a curved conveyor section. The user may then perform a gaze gesture command directed at one of the virtual industrial automation devices 404 corresponding to the curved conveyor section. After detecting the gaze gesture command performed by the user 104, the head mounted device 106 may generate and display a modified visualization 114 that displays the user's selection of the virtual industrial automation device 404.

In some embodiments, based on the configuration of the virtual conveyor system 408, the head mounted device 106 may modify the visualization 114 to display a subset of available virtual industrial automation devices that may be utilized with the configuration of the virtual conveyor system 408. For example, as the user 104 places virtual industrial automation devices to form the virtual conveyor system 408, the head mounted device 106 may display a smaller subset of virtual industrial automation devices that correspond to virtual industrial automation devices that may couple to the user-placed virtual industrial automation devices in the virtual conveyor system 408. In this way, the head mounted device 106 may predict one or more virtual industrial automation devices that the user 104 may desire to select and place next based on one or more previous selections and placements of virtual industrial automation devices performed by the user 104.

Further, in one embodiment, the head mounted device 106 may determine that the user may desire another type of industrial automation device after the selection and placement of a first type of virtual industrial automation device. The head mounted device 106 may display one or more virtual compartments that correspond to the other types of industrial automation devices that the user 104 may desire after selecting and placing the first type of virtual industrial automation device. For example, the head mounted device 106 may determine that the user 104 has finished designing the track of a virtual conveyor system. The head mounted device 106 may modify the visualization 114 to display a virtual compartment associated with various types of virtual movers that may be coupled or placed on the track of the virtual conveyor system. In some embodiments, the head mounted device 106 may modify the visualization 114 to display both virtual industrial automation devices and virtual compartments associated with predicted selections by the user 104 after the user 104 has selected and placed a virtual industrial automation device.

In some embodiments, as shown in FIG. 4, virtual industrial automation devices 402, 404, 406 that have not yet been selected by the user 104 in the visualization 114 associate with the AR environment may be illustrated in dotted lines. After the head mounted device 106 detects a gesture command performed by the user 104 to select a virtual industrial automation device 402, 404, 406, the head mounted device 106 may modify the visualization 114 to display the appearance of the selected virtual industrial automation device in solid lines. It should be noted that the description of the transition between dotted lines and solid lines for displaying not selected and selected virtual industrial automation devices, respectively, is exemplary and non-limiting. Additionally, other embodiments may include transitions in appearance from not selected to selected virtual industrial automation devices, such as a highlighting, a color change, a shading, or any other suitable visual change in appearance.

Figure 5:
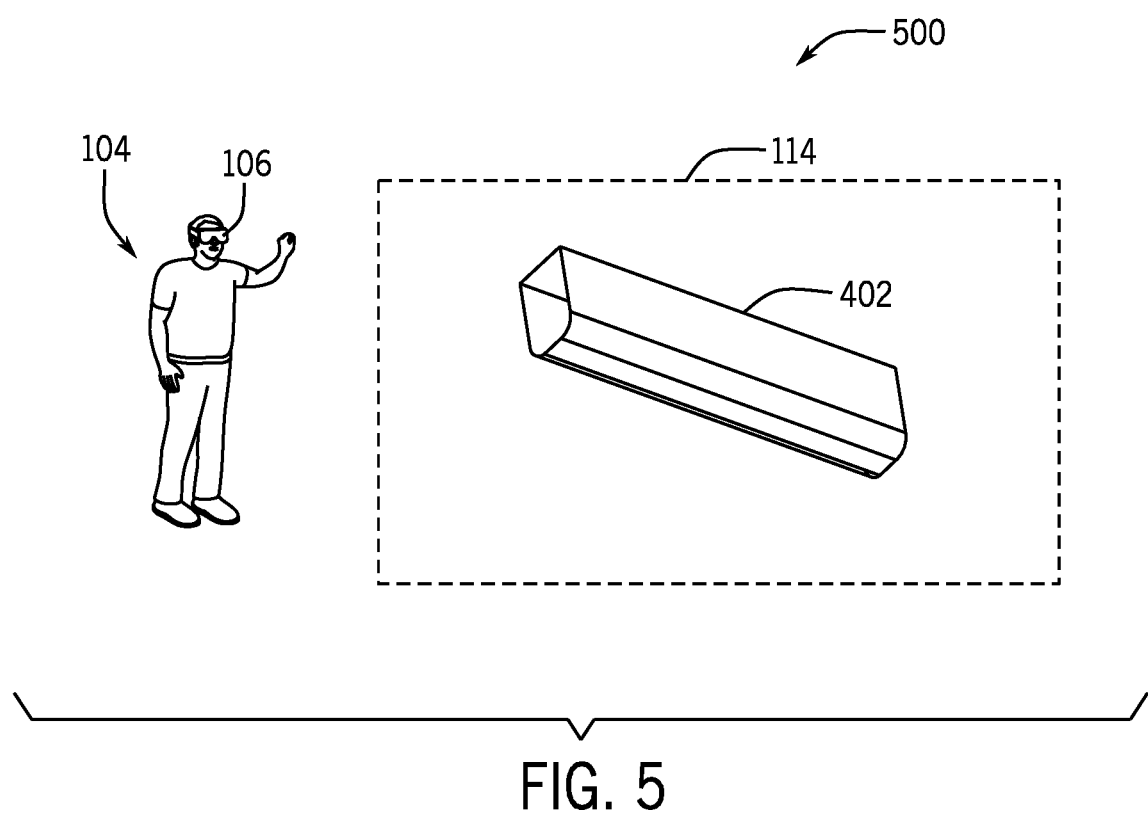
FIG. 5 is perspective view of an exemplary visualization that may be perceived by the user utilizing the display device of FIG. 2 after performing the second gaze gesture command, in accordance with an embodiment.

FIG. 5 illustrates a perspective view 500 of the user 104 utilizing the head mounted device 106 to perceive a modified visualization 114 associated with the AR environment illustrated in FIGS. 3 and 4. After detecting a gaze gesture command performed by the user 104, the head mounted device 106 may determine that the user 104 selected the first virtual conveyor section 402, as shown in FIG. 4. The head mounted device 106 may then generate and display a modified visualization 114 corresponding to the user's selection of the first virtual conveyor section 402. For example, the head mounted device 106 may display the first virtual conveyor section 402 in solid lines in the modified visualization 114 to indicate that the first virtual conveyor section 402 has been selected by the user 104 and/or may now be interacted with by the user in the AR environment.

Figure 6:
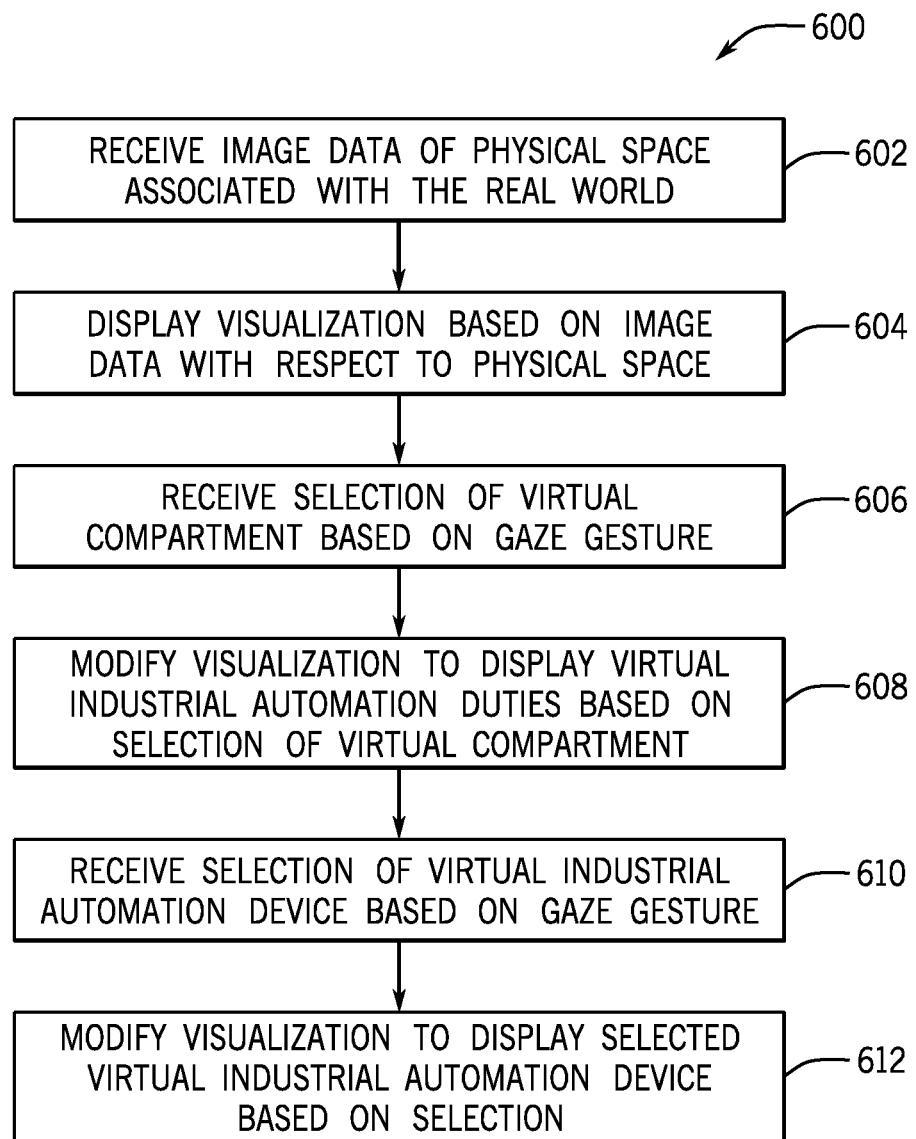
FIG. 6 is a flowchart of a method for displaying and modifying a visualization based on one or more gesture commands using the display device of FIG. 2, in accordance with an embodiment.

With the foregoing in mind, FIG. 6 illustrates a flow chart of a method 600 for displaying and modifying a visualization 114 associated with an AR environment based on one or more gaze gestures commands performed by a user 104. Although the following description of the method 600 is described in a particular order, it should be noted that the method 600 is not limited to the depicted order, and instead, the method 600 may be performed in any suitable order. Moreover, although the method 600 is described as being performed by the head mounted device 106, it should be noted that it may be performed by any suitable computing device communicatively coupled to the head mounting device 106.

Referring now to FIG. 6, at block 602, the head mounted device 106 may receive image data of the physical space associated with the real-world environment of the user 104. In some embodiments, the head mounted device 106 may acquire image data via the one or more cameras 202. The image data may include data that indicates dimensions of the physical space, such as height, width, and length. The head mounted device 106 may then process the acquired image data and display the visualization 114 based on the image data with respect to the physical space associated with the real-world environment of user 104. For example, the cameras 202 may acquire image data of real-world objects within surrounding environment of the user 104. The real-world objects may include physical structures, the user's body, other real-world objects, or portions thereof.

At block 604, the head mounted device 106 may generate and display a visualization 114 based on the acquired image data. For example, the visualization 114 may replicate the acquired image data on a display of the head mounted device 106. In certain embodiments, the head mounted device 106 may generate and display the visualization 114 to simulate the user's perception of the physical space associated with real-world environment of the user 104. For example, the head mounted device 106 may generate and display the visualization 114 to have the same viewing angle, the same field of vision, the same depth of vision, or the like, that the user 104 may perceive of the real-world surrounding the user. Alternatively, the visualization 114 may be presented via a transparent display that allows the user 104 to view the real world surroundings. The visualization 114 may then be superimposed over the transparent display to produce virtual objects within the real world surroundings. In some embodiments, the head mounted device 106 may provide a video see-through display or an optical see-through display to display visualizations to the user.

In some embodiments, the head mounted device 106 may display a virtual compartment 302, 304 that corresponds to a type or category of industrial automation device that may be employed within an industrial system. For example, a virtual compartment 302 may correspond to one or more types of conveyor sections that may be employed within a conveyor system. As such, the head mounted device 106 may display a visualization 114 to a user 104 on a display that includes both real-world and computer-generated content in real-time or substantially real-time. In some embodiments, the user 104 may speak a voice command to indicate the type or category of the industrial automation system that is intended to be placed in the physical space. Otherwise, the user 104 may specify to the head mounted device 106 the type or category of the industrial automation system by scrolling through visualizations that provide categories or types of industrial automation systems that may be designed.

At block 606, the head mounted device 106 may receive a selection of a virtual compartment 302, 304 based on a gaze gesture command performed by the user 104. For example, the head mounted device 106 may acquire image data of the user 104 or a portion thereof, such as the user's arms, hands, fingers, legs, or the like. The head mounted device 106 may then detect a gesture command performed by the user 104 based on the acquired image data. As described above, for example, a gaze gesture may be detected by the head mounted device 106 by tracking the movement of the user's eyes or tracking a cursor indicative of the user's focus in a visualization associated with the AR environment.

After the head mounted device 106 receives an indication of the selection of the virtual compartment 302, 304 based on the gaze gesture command performed by the user 104, the head mounted device 106 may modify the visualization 114 based on the selection of the virtual compartment 302, 304 at block 608. For example, the head mounted device 106 may modify the visualization 114 to display one or more virtual industrial automation devices 402, 404, 406 associated with the selected virtual compartment 302, 304. In some embodiments, the head mounted device 106 may send a request to the computing system 110 for a list of industrial automation devices stored in the database 112 associated with the selected virtual compartment 302, 304. The head mounted device 106 may also send a request to the computing system 110 for specification data associated with each industrial automation device associated with the selected virtual compartment 302, 304. After receiving the list of industrial automation devices associated with the type or category represented by the selected virtual compartment 302, 304 and the specification data associated with each industrial automation device, the head mounted device 106 may modify the visualization 114 to display a virtual industrial automation device based on the specification data in the AR environment. That is, the specification data may include image or dimensional data that may be used to generate a virtual object that represents the virtual industrial automation device.

At block 610, the head mounted device 106 may receive another indication of a selection of a virtual industrial automation device 402, 404, 406 based on a gaze gesture command performed by the user 104. Similar to the selection of the virtual compartment 302, 304 described above, the head mounted device 106 may acquire image data of the user 104 or a portion thereof, such as the user's arms, hands, fingers, legs, or the like. The head mounted device 106 may then detect a gaze gesture command based on the acquired image data.

After the head mounted device 106 receives the selection of the virtual industrial automation device 402, 404, 406 based on the gaze gesture command performed by the user 104, the head mounted device 106 may modify the visualization 114 based on the selection of the virtual industrial automation device 402, 404, 406 at block 612. For example, the head mounted device 106 may modify the visualization 114 by displaying the selected virtual industrial automation device 402, 404, 406. In some embodiments, the selected virtual industrial automation device may be displayed in solid lines as compared to dotted lines when the virtual industrial automation device had not yet been selected. As such, the head mounted device 106 may detect a gaze gesture command performed by a user 104 to select and display a virtual industrial automation device 402, 404, 406 in the visualization 114 of an AR environment.

Additionally, in some embodiments, the head mounted device 106 may detect voice commands issued by the user to provide similar interactions or additional interactions with the virtual compartments 302, 304 and/or the virtual industrial automation devices 402, 404, 406 in the AR environment or with the AR environment itself. For example, the user 104 may look towards a virtual compartment 302, 304 and/or a virtual industrial automation device 402, 404, 406 and may say the voice command "select." After the head mounted device detects the voice command, the head mounted device 106 may perform actions as described herein with respect to the gaze gesture command.

Figure 7:
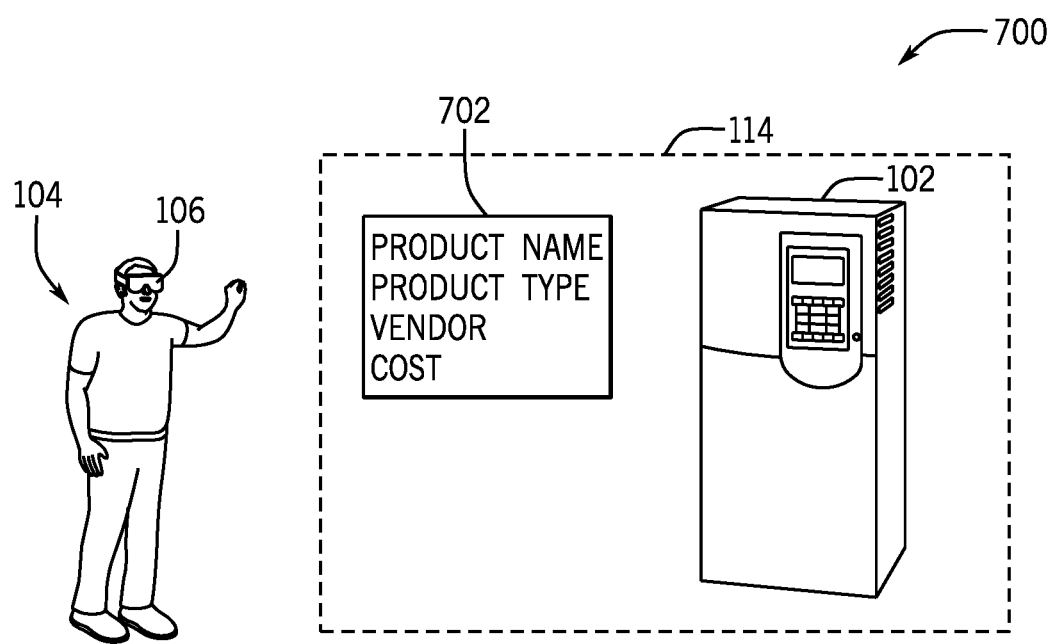
FIG. 7 is a perspective view of an exemplary visualization that may be perceived by the user utilizing the display device of FIG. 2 after performing a gaze gesture command, in accordance with an embodiment.

In some embodiments, the user 104 may perform a gaze gesture command to display information or data associated with an industrial automation device 102. For example, in a design context, the user 104 may wish to know the name, the type, the vendor, the cost, or the like, of an industrial automation device. In another example, the user 104 may wish to know the identification, maintenance, and operational information, or the like, associated with a particular industrial automation device in an existing industrial system. With the foregoing in mind, FIG. 7 illustrates a perspective view 700 of a user 104 utilizing the head mounted device 106 to perceive a visualization 114 that may display identification information 702 associated with an industrial automation device 102. For example, the head mounted device 106 may acquire image data of the surroundings of the user 104 via one or more cameras 202. The head mounted device 106 may then process the acquired image data of the user and the user's surroundings and detect a gaze gesture command performed by the user 104 based on the image data. After detecting the gaze gesture command performed by the user 104, the head mounted device 106 may determine a target of the gaze gesture based on the image data and/or the gaze gesture command. As illustrated in FIG. 7, the target of the gaze gesture may be a virtual motor drive 102. The head mounted device 106 may then receive an identifier associated with the virtual motor drive 102 after determining that the virtual motor drive 102 is the target of the gaze gesture. For example, the head mounted device 106 may retrieve an identifier stored in the memory 210 of the head mounted device 106 that corresponds to the virtual motor drive 102. The head mounted device 106 may then send a request with the identifier to the computing system 110 for identification information associated with the industrial automation device 102. Based on the identifier and the type of request sent by the head mounted device 106, the computing system 110 may send identification information associated with the identifier to the head mounted device 106. After receiving the identification information associated with the identifier, the head mounted device 106 may display a virtual representation of the identification information on or adjacent to the virtual industrial automation device 102 in the visualization 114 associated with the AR environment.

Figure 8:
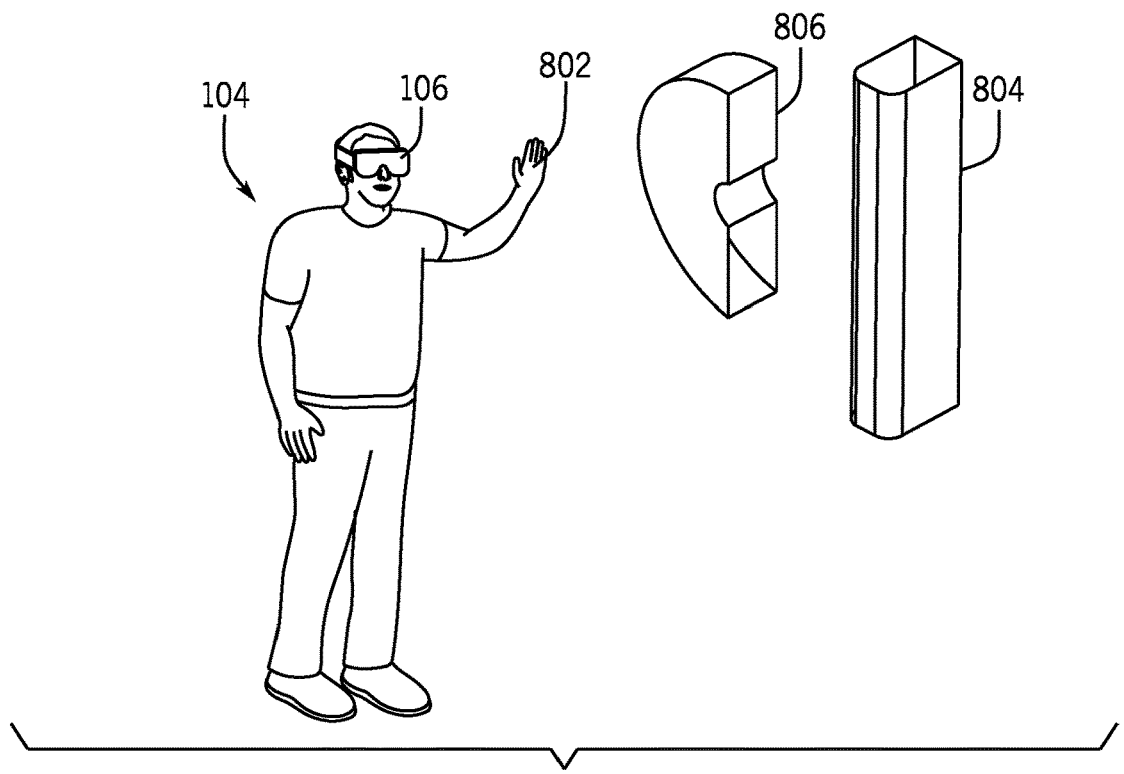
FIG. 8 is a perspective view of an exemplary visualization that may be perceived by the user utilizing the display device of FIG. 2 before performing a grasp gesture command, in accordance with an embodiment.

After the user 104 has selected a virtual industrial automation device 102 within the visualization 114 associated with the AR environment, the user 104 may wish to reposition the virtual industrial automation device 102 within the visualization 114 to a desired position. To help illustrate, FIG. 8 is a perspective view of a user 104 utilizing the head mounted device 106 to reposition a virtual industrial automation device 806 in the visualization 114 associated with an AR environment. The head mounted device 106 may detect a gesture command 802 performed by the user 104 to select the virtual industrial automation device 806 within the visualization 114 associated with the AR environment. In the illustrated embodiment, the gesture command 802 performed by the user 104 may involve the user 104 reaching out in a direction toward a desired virtual industrial automation device 806 with, in one embodiment, a flat or open palm over the selected virtual industrial automation device 806. In other embodiments, the gesture command 802 performed by the user to select the virtual industrial automation device 806 may be a gaze gesture command as described above. Based on the image data, the head mounted device 106 may detect the gesture command 802 performed by the user and the target of the gesture command 802. In the illustrated embodiment, the head mounted device 106 may determine a vector extending along the user's arm or the user's palm toward a virtual industrial automation device 804, 806 based on the image data. The head mounted device 106 may then determine that the virtual industrial automation device 806 is the target of the user's gesture command 802 because the position of the virtual industrial automation device 806 intersects with the vector extending from the user's arm or the user's palm. In some embodiments, the head mounted device 106 may also track the eye movements of the user or track a cursor indicative of the focus of the user 104 in the visualization associated with the AR environment to determine the target of the user's gesture command 802.

Figure 9:
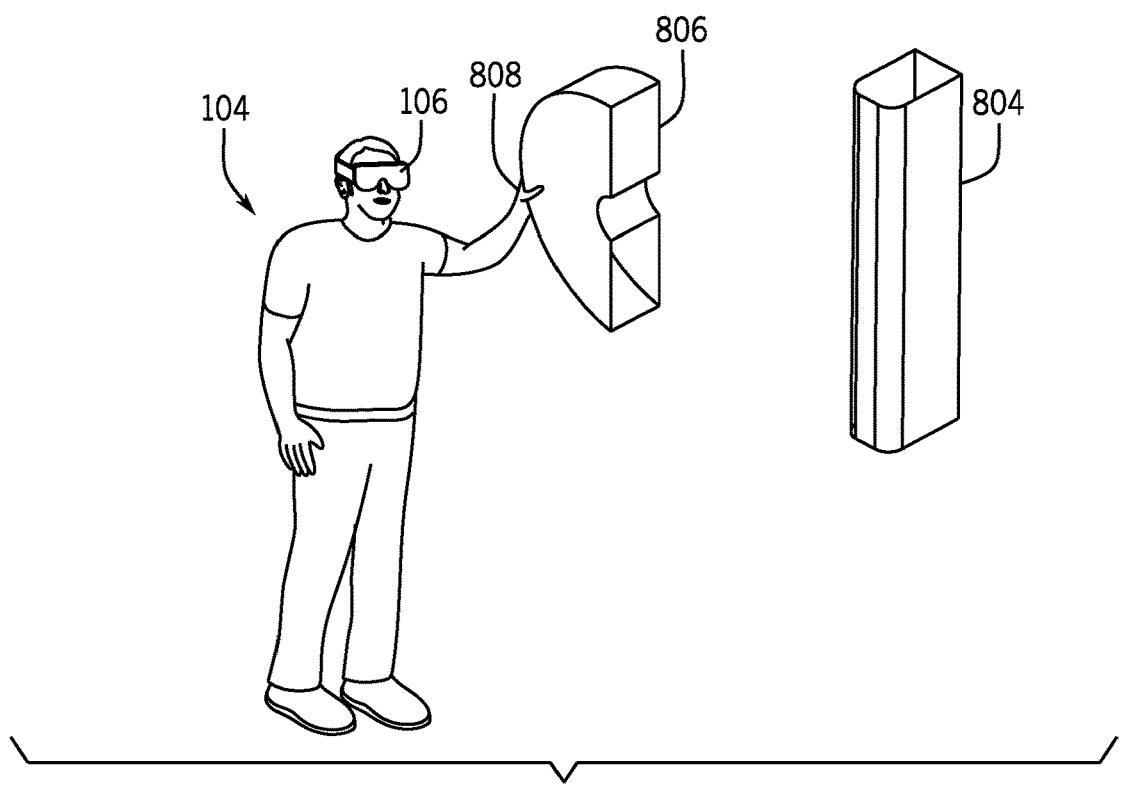
FIG. 9 is a perspective view of an exemplary visualization that may be perceived by the user utilizing the display device of FIG. 2 after performing a grasp gesture command, in accordance with an embodiment.

FIG. 9 is a perspective view of a user 104 utilizing the head mounted device 106 to reposition the virtual industrial automation device 806 to the hand of the user 104. The head mounted device 106 may detect a grasping gesture command 808 by the user 104 with the same hand used to select the virtual industrial automation device 806 as shown in FIG. 8. As described above, the head mounted device 106 may receive image data associated with the user and the user's surroundings and detect the grasping gesture command 808 performed by the user based on the image data. The head mounted device 106 may then identify one or more mapping points associated with the user's hand that performed the grasping gesture command 808. After the head mounted device 106 has detected the grasping gesture command 808, the head mounted device 106 may modify the visualization associated with the AR environment and map the selected virtual industrial automation device 806 to the user's hand that performed the grasping gesture 808 at the one or more identified mapping points. Thereafter, as the user 104 moves the user's hand in the visualization 114 associated with the AR environment, the head mounted device 106 may continuously modify the visualization associated with the AR environment to move (e.g., as an animation) the selected virtual industrial automation device 806 toward the one or more identified mapping points associated with the user's hand. That is, the user 104 may move the virtual industrial automation device 806 in the visualization associated with the AR environment in real-time or substantially real-time after performing a grasping gesture command 808 in the visualization.

In one example, moving the user's hand from the open palm position to the partially closed (e.g., u-shaped) position may be detected as a gesture that causes the head mounted device 106 to move the selected virtual industrial automation device 806 to the hand of the user 104 performing the gesture. The mapped points of the hand may include one or more fingers, the palm, or other distinguishable features of the hand. When the virtual industrial automation device 806 is selected and the grasp gesture is initialized, the head mounted device 106 may cause the virtual industrial automation device 806 to move (e.g., as an animation) towards the mapped points and stay attached to the mapped points until another gesture or voice command is received.

After the user 104 has grasped and/or repositioned a virtual industrial automation device 102 within the visualization 114 associated with the AR environment, the user 104 may wish to drop the virtual industrial automation device 102 within the visualization 114. The head mounted device 106 may detect a let go gesture command (e.g., a release gesture command) performed by the user 104 to release the virtual industrial automation device 806 from the user's hand within the visualization 114 associated with the AR environment. For example, the let go gesture command may involve the user 104 extending the user's fingers from a curled position around the virtual industrial automation device 806. Based on the image data associated with the user 104, the head mounted device 106 may detect the let go gesture command and a position associated with the virtual industrial automation device 806 in the visualization 114 associated with the AR environment. The head mounted device 106 may then un-map the virtual industrial automation device 806 from the user's hand and position the virtual industrial automation device 806 in the detected position where the user 104 uncurled the user's fingers. That is, the head mounted device 106 may modify the visualization 114 associated with the AR environment to display that the virtual industrial automation device 806 is not mapped to the user's hand. Thereafter, the user 104 may move the user's hand in the visualization 114 associated with the AR environment and the virtual industrial automation device 806 may not move with the user's hand within the visualization 114.

Figure 10:
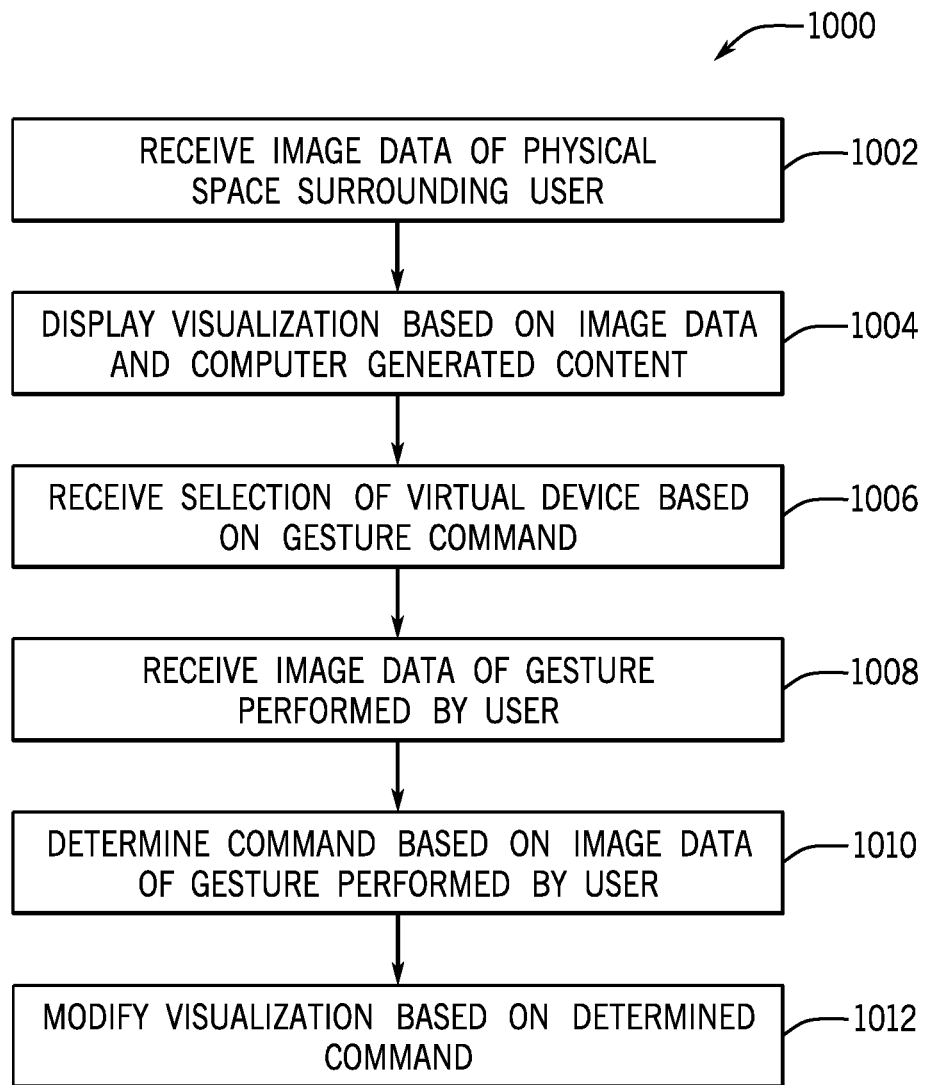
FIG. 10 is a flowchart of a method for displaying and modifying a visualization based on a grasp gesture command using the display device of FIG. 2, in accordance with an embodiment.

With the foregoing in mind, FIG. 10 illustrates a flow chart of a method 1000 for displaying and modifying the visualization 114 based on the grasping gesture 808 performed by a user 104. Although the following description of the method 1000 is described in a particular order, it should be noted that the method 1000 is not limited to the depicted order, and instead, the method 1000 may be performed in any suitable order. Moreover, although the method 1000 is described as being performed by the head mounted device 106, it should be noted that it may be performed by any suitable computing device communicatively coupled to the head mounted device 106.

Referring now to FIG. 10, at block 1002, the head mounted device 106 may receive image data of the physical space associated with the real-world environment of the user 104. In some embodiments, the head mounted device 106 may acquire the image data via one or more cameras 202. The head mounted device 106 may then process the acquired image data and display the visualization 114 based on the image data with respect to the physical space associated with the real-world environment of the user 104. For example, the cameras 202 may acquire image data of real-world objects in the real-world environment surrounding the user. The real-world objects may include physical structures, the user's body, other real-world objects, or portions thereof. At block 1004, the head mounted device 106 may generate and display the visualization 114 based on the acquired image data and computer-generated content. For example, the head mounted device 106 may display the visualization 114 on a display to the user 104 that includes both real-world and computer-generated content, such as the one or more virtual industrial automation devices 806, 808.

At block 1006, the head mounted device 106 may receive a selection of a virtual industrial automation device 804, 806, such as a conveyor section, based on a gaze gesture command or a palm selection gesture 802 command as described above. After the head mounted device 106 receives the selection of the virtual industrial automation device 804, 806 based on the gesture command performed by the user 104, the head mounted device 106 may receive image data associated with the gestures or hands of the user 104 at block 1008. In some embodiments, the head mounted device 106 may acquire the image data associated with the user 104 via the one or more cameras 202. The head mounted device 106 may then analyze the acquired image data for characteristics associated with the grasping gesture command 808. If a threshold of one or more characteristics for the grasping gesture command match a stored, learned, or otherwise interpretable command, the head mounted device 106 may determine a corresponding command to be performed by the head mounted device 106 based on the image data associated with the user 104 at block 1010. For example, in response to the determined command, the head mounted device 106 may determine one or more mapping points between the user's hand that performed the grasping gesture 808 and the selected virtual industrial automation device 806. At block 1012, the head mounted device 106 may then modify the visualization associated with the AR environment based on the determine command by mapping the selected virtual industrial automation device 806 to the user's hand at the one or more mapping points in the visualization 114 associated with the AR environment. That is, the head mounted device 106 may modify the visualization in real-time or substantially real-time to position the selected virtual industrial automation device 806 at the one or more connection points associated with the user's hand.

Additionally, in some embodiments, the head mounted device 106 may detect voice commands issued by the user to provide similar interactions or additional interactions with the virtual industrial automation devices 804, 806 in the AR environment or with the AR environment itself. For example, the user 104 may say the voice command "grasp," or "let go," "drop," or "release." After the head mounted device detects the voice command, the head mounted device 106 may perform actions as described herein with respect to the corresponding grasp gesture command or the corresponding let go gesture command (e.g., release gesture command).

Figure 11:
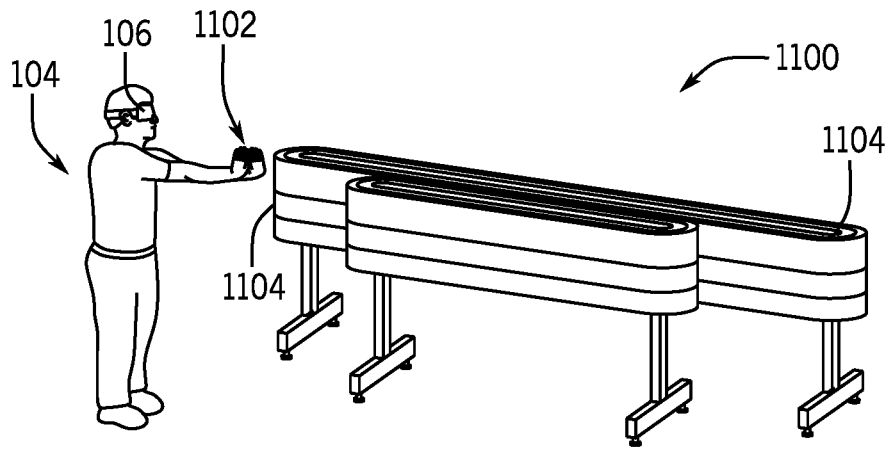
FIG. 11 is a perspective view of an exemplary visualization that may be perceived by the user utilizing the display device of FIG. 2 before performing a push gesture command, in accordance with an embodiment.

After the user 104 has placed a virtual industrial automation device at a position in the visualization 114 associated with the AR environment, the user 104 may wish to move the virtual industrial automation device 102 to different locations in the visualization 114 associated with the AR environment. FIG. 11 illustrates a perspective view 1100 of a user 104 utilizing the head mounted device 106 to perform a push gesture command 1102 or a pull gesture command to move a virtual industrial automation device 1104 to another position in the visualization associated with the AR environment. The head mounted device 106 may detect the push gesture command 1102 or the pull gesture command performed by the user 104 to move (e.g., as an animation) the virtual industrial automation device 1104 in the visualization associated with the AR environment. For example, the head mounted device 106 may receive image data associated with the user 104 and the user's surroundings. Based on the image data associated with the user and the virtual content displayed in the visualization 114, the head mounted device 106 may determine that the gesture command 1102 performed by the user 104 is a push gesture command or a pull gesture command because the user 104 has placed both hands on a virtual surface 1104 of a virtual industrial automation device 1104. The head mounted device 106 may then receive motion data associated with the user 104 to determine whether the gesture command 1102 is a push gesture command or a pull gesture command.

Figure 12:
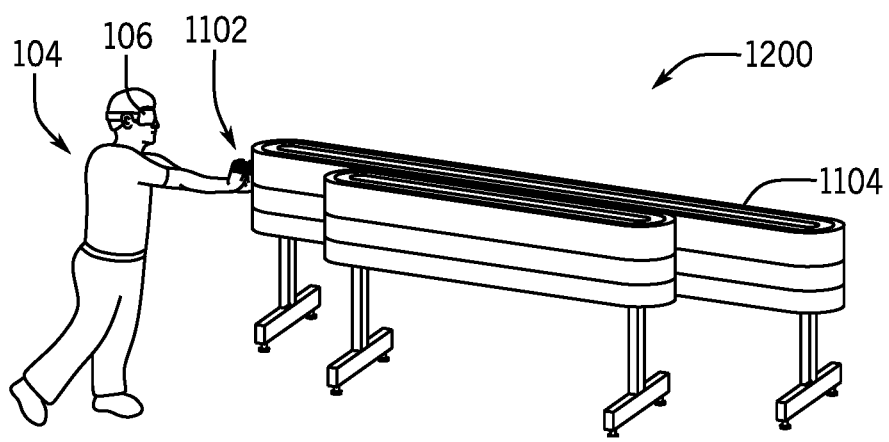
FIG. 12 is a perspective view of an exemplary visualization that may be perceived by the user utilizing the display device of FIG. 2 after performing a push gesture command, in accordance with an embodiment.

To help illustrate, FIG. 12 is a perspective view 1200 of a user 104 utilizing the head mounted device 106 to perform the push gesture 1202 to move the virtual industrial automation device 1104 to another position in the forward direction with respect to the user 104 within the visualization associated with the AR environment. After the head mounted device 106 has determined that the user's stance is indicative of either the push gesture or the pull gesture, the head mounted device may acquire motion data associated with the user 104. In some embodiments, the motion data may be extracted from the image data received by the head mounted device 106. For example, based on the image data associated with the user 104, the head mounted device 106 may determine a direction and a speed at which the user 104 is moving (e.g., walking). Based on the direction of movement associated with the user 104, the head mounted device 106 may determine that the gesture command 1202 is a push gesture command because the user 104 is moving in a forward direction with respect to the position of the user 104 in the visualization 114 or the gesture command is a pull gesture command if the user is moving in a backward direction with respect to the position of the user 104 in the visualization 114. As illustrated in FIG. 12, the head mounted device 106 may determine that the gesture command 1202 is a push gesture command because the user is moving in the forward direction with respect to the position of the user 104. The head mounted device 106 may then modify the visualization 114 associated with the AR environment to display a movement (e.g., as an animation) of the virtual industrial automation device 1104 at the same speed as the motion of the user 104 in the forward direction. In some embodiments, the virtual industrial automation device 1104 may also be mapped to the hands of the user 104 in the same manner described above and the movement of the virtual industrial automation device 1104 may be linked to the movement of the mapped hands.

In some embodiments, the head mounted device 106 may display an animation of the movement of the virtual industrial automation device 1104 after the motion of the user 104 associated with the gesture command 1202 is complete. For example, the head mounted device 106 may modify the visualization 114 to display the animation that the virtual industrial automation device 1104 is moving after the user 104 has completed a pushing or pulling motion associated with the gesture command 1202. The head mounted device 106 may determine a virtual force associated with the gesture command 1202 performed by the user 104 such that the head mounted device 106 may apply the virtual force to the virtual industrial automation device 1104 in the AR environment to simulate a movement of the virtual industrial automation device 1104 in the physical world.

For example, the head mounted device 106 may receive a virtual weight associated with the virtual industrial automation device 1104 from the database 112. In one embodiment, the virtual weight may be configurable by the user 104. In another embodiment, the virtual weight may be based on specification data associated with the physical counterpart device to the virtual industrial automation device 1104.

In any case, the head mounted device 106 may determine an angle that the user 104 is pushing or pulling the virtual industrial automation device 1104. For example, the head mounted device 106 may determine a directional vector extending from the user's arms or hands and compare the directional vector to a horizontal axis associated with the virtual industrial automation device 1104. The head mounted device 106 may then determine an angle associated with the pushing or the pulling gesture motion performed by the user based on the comparison between the directional vector and the horizontal axis. Additionally, the head mounted device 106 may determine a speed of the user's hands or arms in the motion associated with the gesture command 1202 based on motion data associated with user 104. The head mounted device 106 may then determine a virtual force based on the determined angle and speed associated with the user's gesture motion and the virtual weight associated with the virtual industrial automation device 1104. The head mounted device 106 may then apply the virtual force to the virtual industrial automation device 1104 after the user 104 has completed the user's gesture motion associated with the gesture command (e.g., the push gesture command or the pull gesture command). That is, the head mounted device 106 may display an animation of the virtual industrial automation device 1104 moving in the visualization 114 that corresponds to the direction and the speed associated with the virtual force applied to the virtual industrial automation device 1104.

In one embodiment, the virtual industrial automation device 1104 may have one or more friction parameters associated with the virtual industrial automation device 1104 in the AR environment. The head mounted device 106 may display an animation of the virtual industrial automation device 1104 moving slower and/or stopping over time based on the one or more friction parameters associated with the virtual industrial automation device 1104 in the AR environment.

In one embodiment, the head mounted device 106 may differentiate between the user 104 performing a push gesture command and a pull gesture command by determining an orientation of the user's fingers. For example, the head mounted device 106 may detect the push gesture command by determining that the user 104 has placed both hands on a virtual surface of a virtual industrial automation device and that the user's fingers are extended (e.g., straight or upward). In another example, the head mounted device 106 may detect the pull gesture command by determining that the user 104 has placed both hands on a virtual surface of a virtual industrial automation device and that the user's fingers are curled around a virtual edge of the virtual industrial automation device.

Similar to the push gesture command and pull gesture command of FIGS. 11 and 12, in some embodiments, the head mounted device 106 may also detect a nudge gesture command to move a virtual industrial automation device 1104 to another position in the visualization 114 associated with the AR environment. The user 104 may perform the nudge gesture command to cause the head mounted device 106 to modify the visualization 114 to display a finer movement of the virtual industrial automation device 1104 as compared to a movement of the virtual industrial automation device 1104 as a result of the push gesture command or the pull gesture command. That is, after the head mounted device 106 detects the nudge gesture command performed by the user 104, the head mounted device 106 may limit the movement displayed in the visualization 114 of the virtual industrial automation device 1104 to less than a threshold virtual distance, such as the length of the user's arm, the length of the user's hand, or the like. In this way, the head mounted device 106 may more accurately display a desired movement of the virtual industrial automation device 1104 over a shorter virtual distance as compared to a movement of the virtual industrial automation device 1104 as a result of the push gesture command or the pull gesture command.

The head mounted device 106 may detect the nudge gesture command by determining that the user 104 has placed one or both hands on a virtual surface of the virtual industrial automation device 1104 based on image data of the user received by the head mounted device 106 and virtual content displayed in the visualization 114. The head mounted device 106 may then receive motion data associated with the user 104 to determine a direction and a speed at which an arm or a hand of the user 104 is moving in the visualization 114 associated with the AR environment. The head mounted device 106 may then modify the visualization 114 associated with the AR environment to display a movement (e.g., as an animation) of the virtual industrial automation device 1104 at the same speed and in the same direction as the motion of the user's arm or hand.

In some embodiments, the user 104 may wish to lift the virtual industrial automation device upwards in the visualization 114 associated with the AR environment to reposition the virtual industrial automation device or view the underside of the virtual industrial automation device. The user 104 may perform a lift gesture command that involves the user 104 placing the user's hand on the underside surface (e.g., a surface facing the floor of the AR environment) of a virtual industrial automation device. In one embodiment, the lift gesture command may involve the user 104 bending the knees of the user 104 to simulate a lifting motion of an object upwards. In another embodiment, the lift gesture command may involve the user 104 placing the user's hands on a first surface of the virtual industrial automation device and curling the user's fingers around a virtual edge of the virtual industrial automation device such that the user's fingers are touching an underside surface of the virtual industrial automation device. In any case, the head mounted device 106 may detect the lift gesture command performed by the user 104 to move (e.g., as an animation) the virtual industrial automation device 1104 upward in the visualization 114 associated with the AR environment. For example, based on image data associated with the user 104 and the virtual content displayed in the visualization 114, the head mounted device 106 may determine that the gesture command performed by the user 104 is a lift gesture command because the user 104 has placed one or both hands on a virtual underside surface of a virtual industrial automation device.

The head mounted device 106 may then receive motion data associated with the user 104. Based on the motion data, the head mounted device 106 may determine a direction and an angle of movement associated with the user's hands, arms, or the like, to move the virtual industrial automation device in the visualization 114 (e.g., via an animation). For example, the head mounted device 106 may determine a directional vector extending from the user's arms or hands and compare the directional vector to a vertical axis associated with the virtual industrial automation device 1104. The head mounted device 106 may then determine an angle associated with the lifting gesture motion performed by the user 104 based on the comparison between the directional vector and the vertical axis. Additionally, the head mounted device 106 may determine a speed of the user's hands or arms in the motion associated with the lift gesture command based on motion data associated with user 104. The head mounted device 106 may then move the virtual industrial automation device 1104 via the animation in the visualization 114 after the user 104 has completed the user's gesture motion associated with the lift gesture command. That is, the head mounted device 106 may display an animation of the virtual industrial automation device 1104 moving in the visualization 114 that corresponds to the determined direction and the determined speed associated user's lift gesture motion. In some embodiments, the virtual industrial automation device may also be mapped to the hands of the user 104 in the same manner described above and the movement of the virtual industrial automation device 1104 may be linked to the movement of the mapped hands.

In some embodiments, the head mounted device 106 may be communicatively coupled to one or more haptic feedback devices (e.g., actuators) that provide vibrations to the user 104 based on one or more conditions determined by the head mounted device 106 associated with a movement of the user 104, a movement of the virtual industrial automation device, or the like, in the visualization 114 associated with the AR environment. The haptic feedback devices may be worn, or otherwise attached, to the user 104 or portions of the user 104, such as the user's hands, fingers, feet, legs, or any other suitable body part. The head mounted device 106 may send a signal to the haptic feedback devices to provide vibrational feedback to the user 104 to indicate one or more conditions associated with a movement of the user 104, a movement of the virtual industrial automation device, or the like, in the visualization 114 associated with the AR environment. For example, the head mounted device 106 may send a signal to the haptic feedback devices to provide a vibration to the user 104 after detecting that the user 104 has pushed a virtual industrial automation device into a wall or other boundary. In another example, the head mounted device 106 may send a signal to the haptic feedback devices to provide a vibration to the user 104 to notify the user of a message or an alert. It should be understood that the examples provided above are intended to be non-limiting and that the head mounted device 106 may send a signal to the haptic feedback devices to provide vibrational feedback to notify the user of any conditions associated with virtual objects, the user 104, the AR environment, or the like. In some embodiments, the vibrational feedback provided to the user 104 may also be accompanied by voice alerts or notifications to the user 104.

Figure 13:
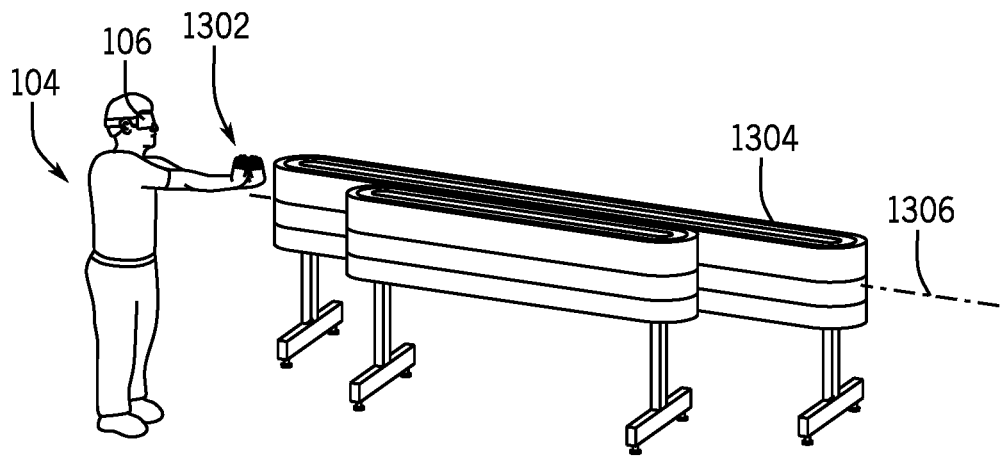
FIG. 13 is a perspective view of an exemplary visualization that may be perceived by the user utilizing the display device of FIG. 2 before performing a rotate gesture command, in accordance with an embodiment.

In addition to facilitating the movement of a virtual industrial automation device by a user 104 to different locations within the visualization 114 associated with the AR environment, the head mounted device 106 may facilitate a rotation of the virtual industrial automation device along one or more axes of rotations of the virtual industrial automation device in the visualization associated with the AR environment. FIG. 13 illustrates a perspective view of the user 104 utilizing the head mounted device 106 to perform a rotate gesture command 1302 to rotate a virtual industrial automation device 1304 along a rotational axis 1306 of the virtual industrial automation device 1304 within the visualization 114 associated with the AR environment. The head mounted device 106 may receive image data associated with the user 104. Based on the image data associated with the user 104 and virtual content displayed in the visualization 114 associated with the AR environment, the head mounted device 106 may detect the rotate gesture command 1302 performed by the user 104 by determining that the user 104 has placed one or both hands on a virtual edge of the virtual industrial automation device 1304. In one embodiment, the head mounted device 106 may detect that the user 104 has placed one or both hands on the virtual edge of the virtual industrial automation device 1304 by determining that the positions of the user's hands (e.g., fingers, palm, wrist, or a combination thereof) align or overlap with a boundary (e.g., virtual edge) where two virtual surfaces of the virtual industrial automation device 1304 intersect. In one embodiment, the head mounted device 106 may detect that the user 104 is performing a rotate gesture command (e.g., as compared to a push gesture command, a pull gesture command, or a nudge gesture command) if the user 104 is moving the user's arm or the user's hand at an angle with respect to the virtual industrial automation device 102.

Alternatively, the user may issue the voice command "rotate" before performing the gesture or while performing the gesture. The head mounted device 106 may then detect the voice command and distinguish the associated rotate gesture command from the push gesture command or the pull gesture command. In one embodiments, after the head mounted device 106 issues the voice command "rotate," the head mounted device 106 may modify the visualization to display one or more permissible rotational axes (e.g., 1306) that the user 104 may rotate the virtual industrial automation device 1304 about.

The head mounted device 106 may then receive motion data associated with the user 104. In some embodiments, the motion data may be extracted from the image data associated with the user 104. The head mounted device 106 may then determine a direction of rotation and a speed of rotation based on the movement of the user's hands or arms on the virtual edge of the virtual industrial automation device 1304. For example, if the user's hand appears to be pushing downwards on the virtual edge of the virtual industrial automation device 1304, the head mounted device 106 may determine that the direction of rotation is counterclockwise with respect to an axis of rotation of the virtual industrial automation device 1304. In another example, if the user's hand appears to be pushing upwards on the virtual edge of the industrial automation device 1304, the head mounted device 105 may determine that the direction of rotation is counter-clockwise with respect to an axis of rotation of the virtual industrial automation device 1304.

In some embodiments, the head mounted device 106 may receive specification data associated with the virtual industrial automation device 1304 that includes one or more permissible axes of rotation 1306 associated with the virtual industrial automation device 1304. In some embodiments, the permissible axes of rotation 1306 may correspond to axes of rotation associated with the actual counterpart device in the real world. For example, a permissible axis of rotation 1306 may correspond to an axis of rotation 1306 that extends through the center of mass of the actual counterpart device.

Additionally, the head mounted device 106 may prevent a user 104 from rotating the virtual industrial automation device 1304 to an orientation that is not possible in the real world or that would prevent the functioning of the actual counterpart device in the real world. For example, if the user 104 attempts to rotate a virtual conveyor section to an orientation in which a portion of the conveyor section is embedded in the ground or the conveyor side of the conveyor section is facing the ground, the head mounted device 106 may stop the rotation of the virtual industrial automation device 102 in a position before the virtual industrial automation device 102 is rotated to the impermissible position. In one embodiment, the head mounted device 106 may permit the user 104 to rotate the virtual industrial automation device 1304 to an impermissible orientation but modify the visualization 114 to display an alert or an error notification that the virtual industrial automation device is in an impermissible orientation.

After, the head mounted device 106 receives the specification data associated with the virtual industrial automation device 1304, the head mounted device 106 may determine the axis of rotation 1306 based on a position, a motion, or both, of the user's hands on the virtual edge of the virtual industrial automation device 1304 and the specification data. For example, the head mounted device 106 may determine the axis of rotation 1306 based on possible rotational directions of rotations that may be applied to the virtual industrial automation device 1304 from the position, the motion, or both, of the user's hands on the virtual edge of the virtual industrial automation device 1304.

In some embodiments, the user 104 may adjust the axis of rotation 1306. For example, after detecting the rotate gesture command performed by the user 104, the head mounted device 106 may modify the visualization 114 to display a default axis of rotation 1306. The user 104 may then select the default axis of rotation by performing an axis repositioning gesture command by placing one or both hands on a portion of the default axis of rotation 1306 to select it or perform a gesture command (e.g., the gaze gesture command) to select it. After the head mounted device 106 detects the axis repositioning gesture command or the gaze gesture command, the head mounted device 106 may map the axis to one or more connection points on the hand or hands of the user (e.g., the fingers or the palm of the user). Thereafter, the user 104 may move the user's hand and the head mounted device 106 may modify the visualization 114 to move (e.g., as an animation) the axis to the position of the user's hand or hands. In one embodiment, for example, the head mounted device 106 may map the axis of rotation to the user's hand as if the user was grabbing a pole. The user 104 may then adjust the position or the orientation of the axis to a desired position or a desired orientation.

Figure 14:
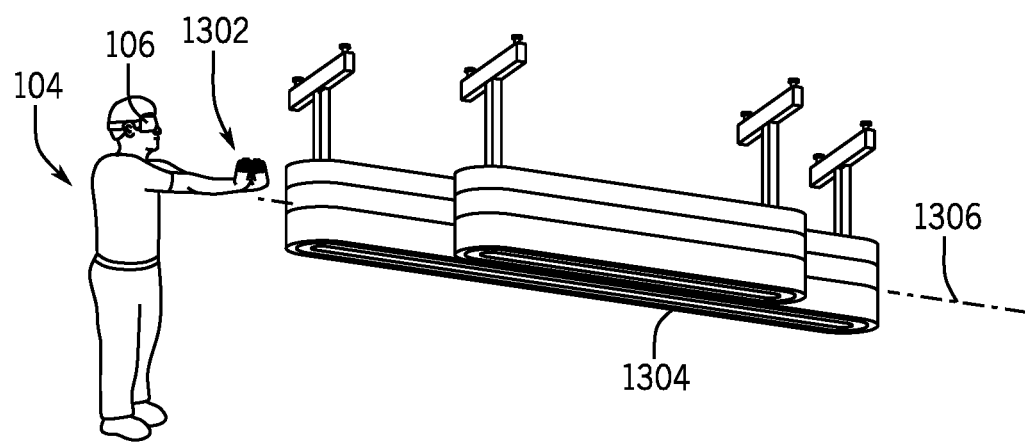
FIG. 14 is a perspective view of an exemplary visualization that may be perceived by the user utilizing the display device of FIG. 2 after performing a rotate gesture command, in accordance with an embodiment.

After the head mounted device 106 determines the direction of rotation and the speed of rotation, the head mounted device 106 may then modify the visualization 114 to display a rotation of the virtual industrial automation device 1304 about the determined axis of rotation at the determined direction and speed of rotation, as illustrated by FIG. 14.

In some embodiments, the user 104 may rotate and move a virtual industrial automation device 1304 simultaneously. For example, the head mounted device 106 may detect that the user has performed a push gesture command, a pull gesture command, a nudge gesture command, or the like, at an angle. As described above, the head mounted device 106 may display a rotation of the virtual industrial automation device at the determined angle about a rotational axis associated with the virtual industrial automation device 1304 and a movement of the virtual industrial automation device 1304 at a speed and in a certain direction associated with the gesture command.

In some embodiments, the size of the virtual industrial automation device 1304 may be too large to conveniently manipulate (e.g., rotate, move, push, or pull) in the visualization 114 associated with the AR environment. In such embodiments, the user 104 may be able to perform a scale down command to reduce the size of the virtual industrial automation device 1304 in the visualization 114. For example, after the user 104 has selected a virtual industrial automation device (e.g., via a gaze gesture command), the user may issue a voice command, such as "scale down," "smaller," or the like, to reduce the size of the virtual industrial automation device 1304. Additionally, the user 104 may be able perform a scale up command to increase the size of the virtual industrial automation device 1304 in the visualization. For example, after the user 104 has selected a virtual industrial automation device (e.g., via a gaze gesture command), the user may issue a voice command, such as "scale up," "larger," "grow," or the like, to increase the size of the virtual industrial automation device 1304. In addition, the user 104 may scale up the virtual industrial automation device using hand motions. For example, the user 104 may extend his hands at two edges or ends of the virtual industrial automation device and move them outward. Alternatively, the user 104 may scale down the virtual industrial automation device by extending his hands at two edges or ends of the virtual industrial automation device and moving them inward towards each other.

Figure 15:
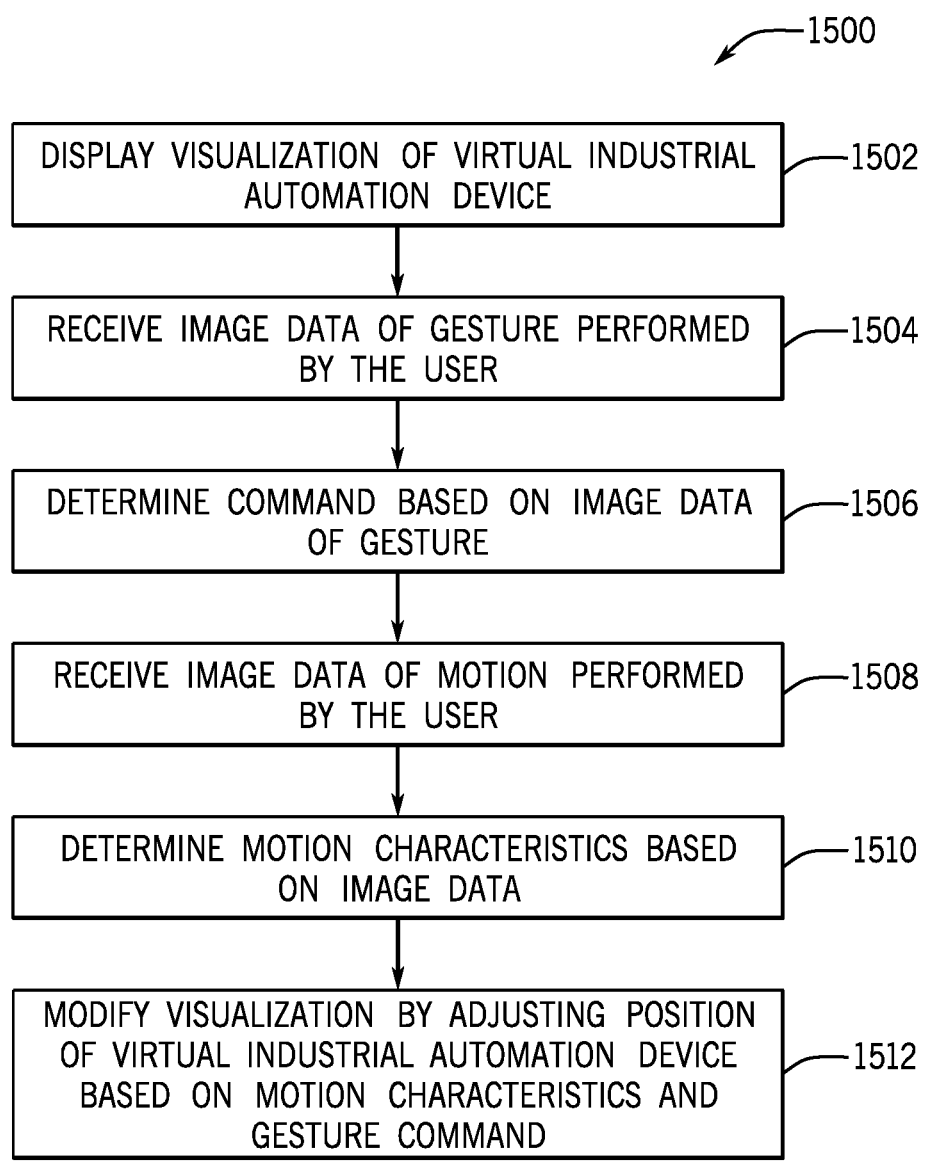
FIG. 15 is a flowchart of a method for displaying and modifying a visualization based on a push gesture command, a pull gesture command, or a rotate gesture command using the display device of FIG. 2, in accordance with an embodiment.

With the foregoing in mind, FIG. 15 illustrates a flow chart of a method 1500 for displaying and modifying a visualization 114 based on one or more gesture commands performed by the user 104 to move a virtual industrial automation device in a visualization 114 associated with an AR environment. Although the following description of the method 1500 is described in a particular order, it should be noted that the method 1500 is not limited to the depicted order, and instead, the method 1500 may be performed in any suitable order. Moreover, although the method 1500 is described as being performed by the head mounted device 106, it should be noted that it may be performed by any suitable computing device communicatively coupled to the head mounted device 106.

Referring now to FIG. 15, at block 1502, the head mounted device 106 generate and display the visualization 114 based on virtual content and received image data associated with the user 104 and the real-world environment of the user 104. For example, the head mounted device 106 may display a visualization 114 that includes a virtual industrial automation device positioned in the real-world environment of the user 104 in real-time or substantially real-time.

At block 1504, the head mounted device 106 may receive image data associated with a gesture command performed by a user 104. For example, the gesture command may include a push gesture command, a pull gesture command, a nudge gesture command, a rotate gesture command, or the like. The head mounted device 106 may then analyze the acquired image data for characteristics associated with the one or more gesture commands. If a threshold of one or more characteristics for a particular gesture command match a stored, learned, or otherwise interpretable command, the head mounted device 106 may determine a corresponding command to be performed by the head mounted device 106 based on the image data associated with the user 104 at block 1506. For example, as described above, a push gesture command involves the user 104 placing both hands on a virtual surface of a virtual industrial automation device. Based on the image data associated with the gesture performed by the user, the head mounted device 106 may determine that the gesture command corresponds to the push gesture command if the head mounted device 106 determines that the both of the user's hands are placed on a virtual surface of a virtual industrial automation device.

After determining the gesture command, at block 1508, the head mounted device 106 may receive motion data associated with the user 104. In some embodiments, the motion data is extracted from received image data associated with the user 104. At block 1510, the head mounted device 106 may determine one or more motion characteristics associated with the gesture command performed by the user 104. For example, with regard to the push gesture command, the head mounted device 106 may determine a direction and a speed at which the user 104 is moving (e.g., walking) based on the motion data. It should be noted that the motion data described in the present disclosure may also be acquired using velocity sensors, position sensor, accelerometers, and other suitable speed detection sensors disposed on the head mounted device 106.

At block 1512, the head mounted device 106 may then modify the visualization 114 associated with the AR environment based on the determined gesture command and motion characteristics. For example, with regard to the push gesture command, the head mounted device 106 may modify the visualization associated with the AR environment by moving the virtual industrial automation device at the same speed and in the same direction as the movement of the user.

Additionally, in some embodiments, the head mounted device 106 may detect voice commands issued by the user to provide similar interactions or additional interactions with the virtual industrial automation devices in the AR environment or with the AR environment itself. For example, the user 104 may say the voice command "push," "pull," "rotate," "nudge," "lift," or the like. After the head mounted device detects the voice command, the head mounted device 106 may perform actions as described herein with respect to the corresponding gesture command (e.g., the push gesture command, the pull gesture command, the nudge gesture command, the rotate gesture command, the lift gesture command).

Figure 16:
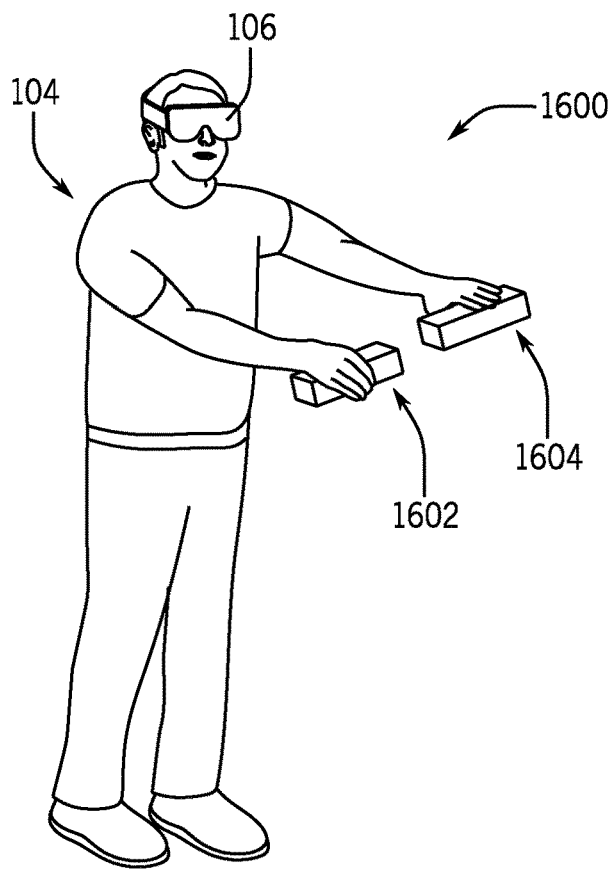
FIG. 16 is a perspective view of an exemplary visualization that may be perceived by the user utilizing the display device of FIG. 2 before performing a snap gesture command, in accordance with an embodiment.

After the user 104 has moved one or more virtual industrial automation devices to a desire position, the user 104 may wish to combine the one or more virtual industrial automation devices to form design of the industrial system. To help illustrate, FIG. 16 is a perspective view 1600 of the user 104 utilizing the head mounted device 106 to couple a first virtual industrial automation device 1602 and a second virtual industrial automation device 1604 in the visualization 114 associated with an AR environment. In the illustrated embodiment, the user 104 may have performed grasping gesture commands using each hand to map the first virtual industrial automation device 1602 to the user's right hand and the second virtual industrial automation device 1604 to the user's left hand.

Figure 17:
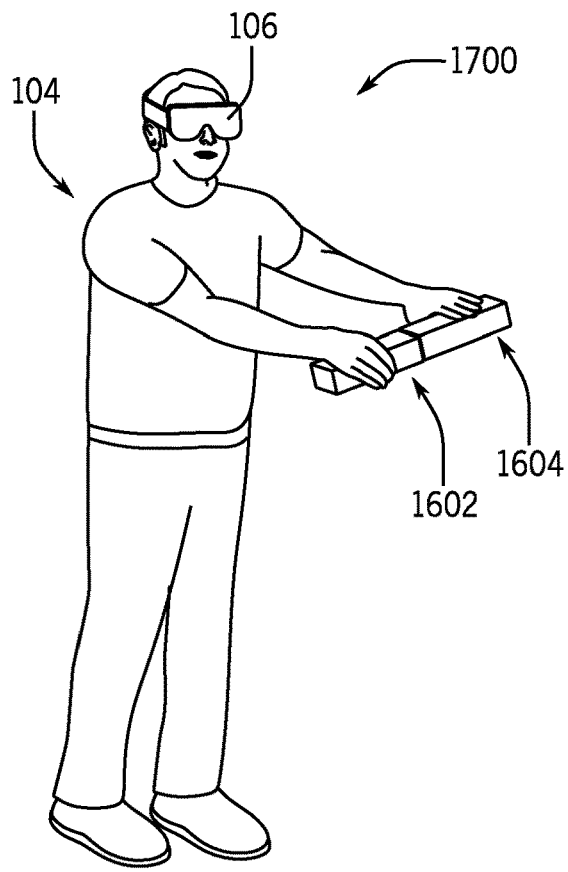
FIG. 17 is a perspective view of an exemplary visualization that may be perceived by the user utilizing the display device of FIG. 2 after performing a snap gesture command, in accordance with an embodiment.

The head mounted device 106 may detect a snap gesture command performed by the user 104 to couple the first virtual industrial automation device 1602 and the second virtual industrial automation device 1604. For instance, in the illustrated embodiment, the snap gesture command 802 performed by the user 104 may involve the user 104 bringing both hands together while grasping a respective virtual industrial automation device in each hand. The head mounted device 106 may detect the snap gesture command after receiving image data associated with the hands of the user 104 and the user's surroundings. Based on the image data of the user 104 and the virtual data displayed in the visualization 114, the head mounted device 106 may determine that the user 104 is performing the snap gesture with the first virtual industrial automation device 1602 and the second virtual industrial automation device 1604. For instance, if the user's hands are moving towards each other and each hand includes a virtual industrial automation component or device that may interface with each other, the image data that illustrates the movement of the hands with the connectable virtual component may detect the snap gesture. After detecting the snap gesture performed by the user 104, the head mounted device 106 may modify the visualization 114 associated with the AR environment to couple (e.g., snap) the first virtual industrial automation device 1602 with the second virtual industrial automation device 1604 at one or more predetermined connection points, as shown in FIG. 17. In some embodiments, the head mounted device 106 may provide a snapping motion or a magnetic motion when coupling the first virtual industrial automation device 1602 and the second virtual industrial automation device 1604. That is, the first virtual industrial automation device 1602 and the second virtual industrial automation device 1604 may be brought together at a certain speed until they are within a threshold distance of each other. At that time, the first virtual industrial automation device 1602 and the second virtual industrial automation device 1604 may accelerate or increase its speed toward each other to mimic a magnetic attraction or snap effect. In one embodiment, the head mounted device 106 may provide a snapping sound that may accompany the coupling of the first virtual industrial automation device 1602 and the second virtual industrial automation device 1604 together. The snapping sound may correspond to a pop sound, click sound, or other sound (e.g., ring, chime) that conveys to the user 104 that the first virtual industrial automation device 1602 and the second virtual industrial automation device 1604 has connected.

In some embodiments, the head mounted device 106 may determine a compatibility between the first virtual industrial automation device 1602 and the second virtual industrial automation device 1604 before modifying the visualization associated with the AR environment to couple the devices together. For example, the head mounted device 106 may receive compatibility data associated with the first virtual industrial automation device 1602 and the second virtual industrial automation device 1604 from the computing system 110 or other suitable memory component after detecting the snap gesture command performed by the user 104. Based on the compatibility data associated with the first virtual industrial automation device 1602 and the second virtual industrial automation device 1604, the head mounted device 106 may determine if the first virtual industrial automation device 1602 and the second virtual industrial automation device 1604 are compatible or not compatible (e.g., whether the real-world counterparts would couple together or not). The compatibility data may be based on specification data related to each of the first virtual industrial automation device 1602 and the second virtual industrial automation device 1604. The specification data may detail devices or components that connect to each other, types of interconnects, male counterpart component, female counterpart components, and the like.

After determining that the first virtual industrial automation device 1602 and the second virtual industrial automation device 1604 are not compatible, the head mounted device 106 may display an error message in the visualization 114 notifying the user 104 of the incompatibility. In some embodiments, the head mounted device may display a recommendation associated with the compatibility of the first virtual industrial automation device 1602 and the second virtual industrial automation device 1604 with other virtual industrial automation devices.

After the user 104 has coupled one or more virtual industrial automation device into a joint virtual industrial automation device, the user 104 may wish to separate the one or more virtual industrial automation devices from each other using a gesture detected by the head mounted device 106. To help illustrate, FIG. 17 is a perspective view 1700 of the user 104 utilizing the head mounted device 106 to separate a first virtual industrial automation device 1602 and a second virtual industrial automation device 1604 in a visualization 114 associated with an AR environment. In the illustrated embodiment, the user 104 may have performed the grasping gesture command using one or both hands to map the joint virtual industrial automation device to one hand or both hands, respectively.

The head mounted device 106 may detect a separate gesture command performed by the user 104 to separate the first virtual industrial automation device 1602 from the second virtual industrial automation device 1604. In the illustrated embodiment, the separate gesture command 802 performed by the user 104 may involve the user 104 separating the user's hands while the user 104 is grasping a different section (e.g., the first virtual industrial automation device 1602 and the second virtual industrial automation device 1604) of the joint virtual industrial automation device. The head mounted device 106 may detect the separate command after receiving image data associated with the user 104 and the user's surroundings. Based on the image data of the user 104 and the virtual data displayed in the visualization 114, the head mounted device 106 may determine that the user 104 is performing the separate gesture with the joint virtual industrial automation device. After detecting the separate gesture performed by the user 104, the head mounted device 106 may modify the visualization 114 associated with the AR environment to separate the first virtual industrial automation device 1602 from the second virtual industrial automation device 1604 at one or more predetermined disconnection points, as shown in FIG. 16.

In some embodiments, the head mounted device 106 may determine whether the user's hands are positioned about a line or a point of severance between the first virtual industrial automation device 1602 from the second virtual industrial automation device 1604 in the joint virtual industrial automation device. For example, the head mounted device 106 may determine a position of each hand of the user along a joint virtual industrial automation device. The head mounted device 106 may then determine that a line or a point of severance associated with the joint virtual industrial automation device is located between the positions of each user's hands along the joint virtual industrial automation device. In some embodiments, the head mounted device 106 may detect a gaze gesture command performed by the user 104 and directed towards the joint virtual industrial automation device. After detecting the gaze gesture command performed by the user 104, the head mounted device 106 may determine one or more severance joints in the joint virtual industrial automation device and modify the visualization to display the one or more determined severance joints. For example, the head mounted device 106 may determine that a joint virtual industrial automation device has a first severance joint between a first and a second virtual industrial automation device in the joint virtual industrial automation device, and the head mounted device 106 may determine that the joint virtual industrial automation device has a second severance joint between the second virtual industrial automation device and a third virtual industrial automation device. The head mounted device 106 may then modify the visualization 114 associated with the AR environment to display the first and second severance joints associated with the joint virtual industrial automation device.

In one embodiment, the user 104 may place the user's hands at desired positions about a desired severance joint to select the severance joint. For example, the head mounted device 106 may determine that the user 104 has selected a desired severance joint by detecting the positions of the user's hands, arms, fingers, or any other suitable body part on either side of one of the displayed severance joints. In another embodiment, the user 104 may perform a gaze gesture command directed toward one of the severance joints to select the desired severance joint. For example, the head mounted device 106 may determine that the user 104 has selected a desired severance joint by detecting that the user 104 has performed the gaze gesture command, as described herein, and the target of the gaze gesture command is one of the displayed severance joints.

If the head mounted device 106 determines that the severance joint (e.g., the line or the point of severance) is not between the positions of each user's hands along the joint virtual industrial automation device, the head mounted device 106 may display an error message in the visualization 114 associated with the determination. In some embodiments, the head mounted device 106 may display a recommendation to the user 104 in the visualization. For example, the head mounted device 106 may highlight the line or point of severance between the first virtual industrial automation device 1602 from the second virtual industrial automation device 1604 in the joint virtual industrial automation device.

Figure 18:
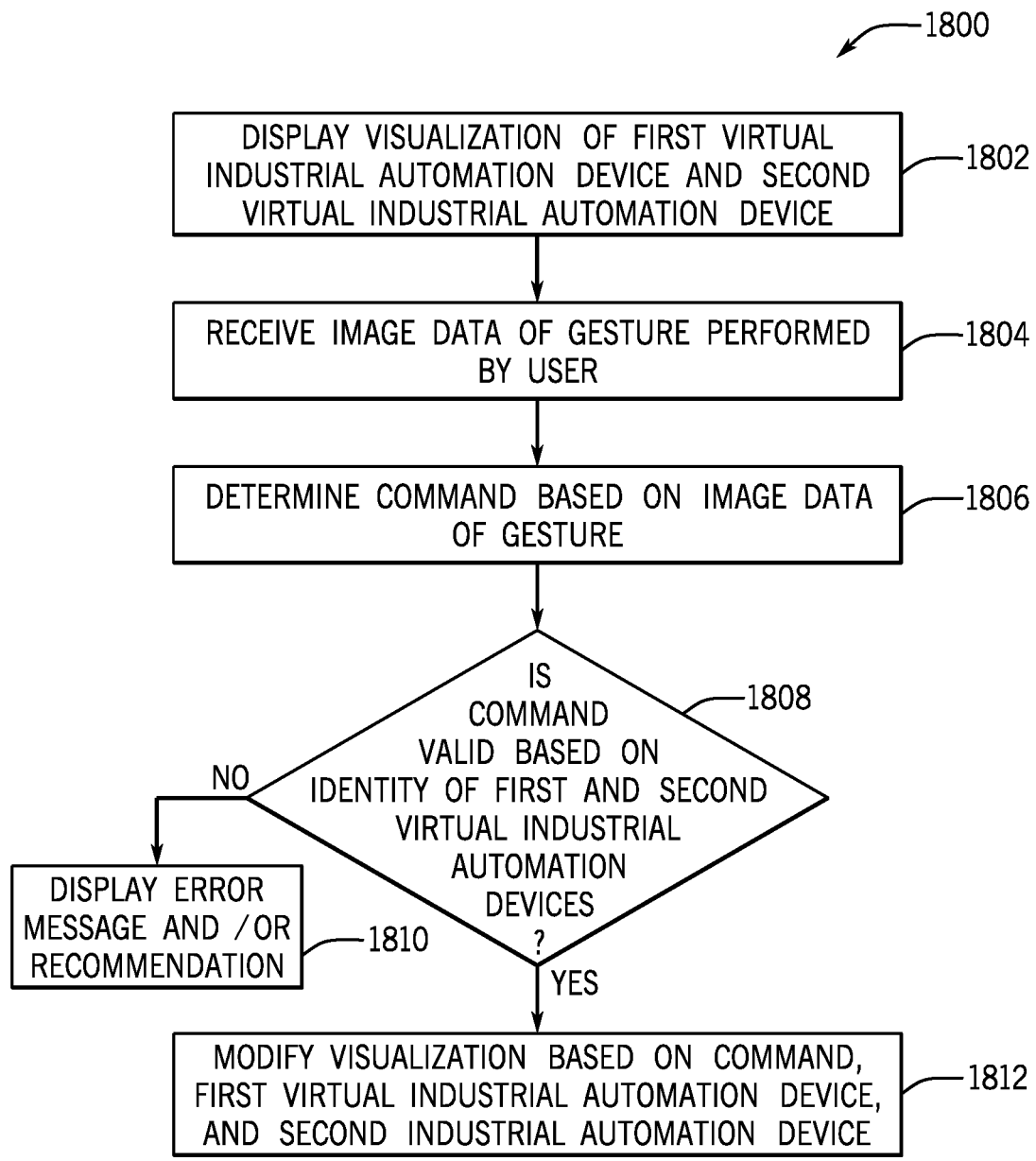
FIG. 18 is a flowchart of a method for displaying and modifying a visualization based on a snap gesture command or a separate gesture command using the display device of FIG. 2, in accordance with an embodiment.

With the foregoing in mind, FIG. 18 illustrates a flow chart of a method 1800 for displaying and modifying a visualization 114 based on a snap gesture or a separate gesture command performed by a user 104 in a visualization 114 associated with an AR environment. Although the following description of the method 1800 is described in a particular order, it should be noted that the method 1800 is not limited to the depicted order, and instead, the method 1800 may be performed in any suitable order. Moreover, although the method 1800 is described as being performed by the head mounted device 106, it should be noted that it may be performed by any suitable computing device communicatively coupled to the head mounted device 106.

Referring now to FIG. 18, at block 1802, the head mounted device 106 may generate and display the visualization 114 based on virtual content and received image data associated with the user 104 and the real-world environment of the user 104. For example, the head mounted device 106 may display a visualization 114 that includes first virtual industrial automation device and a second industrial automation device positioned in the real-world environment of the user. At block 1804, the head mounted device 106 may receive image data associated with a gesture command performed by the user 104. For example, the gesture command may include a snap gesture command, a separate gesture command, or the like. The head mounted device 106 may then analyze the acquired image data for characteristics associated with one or more gesture commands. If a threshold of one or more characteristics for a particular gesture command match a stored, learned, or otherwise interpretable command, the head mounted device 106 may determine a corresponding command to be performed by the head mounted device 106 based on the image data associated with the user 104 at block 1806. For example, as described above, a snap gesture command involves the user 104 bringing both hands together while grasping a respective virtual automation device in each hand and the separate gesture command involves the user separating the user's hands while the user 104 is grasping a different section (e.g., the first virtual industrial automation device 1602 and the second virtual industrial automation device 1604) of the joint virtual industrial automation device.

After determining the gesture command, at block 1808, the head mounted device 106 may determine whether the command is valid based on the identity of the first virtual industrial automation device 1602 and the second virtual industrial automation device 1604. As described above, with regard to the snap gesture command, the head mounted device 106 may determine a compatibility between the first virtual industrial automation device 1602 and the second virtual industrial automation device 1604. If the head mounted device 106 determines that the first virtual industrial automation device 1602 and the second virtual industrial automation device 1604 are not compatible, the head mounted device 106 may display an error message and/or a recommendation at block 1810.

If the head mounted device 106 determines that the first virtual industrial automation device 1602 and the second virtual industrial automation device 1604 are compatible, the head mounted device 106 may proceed to block 1812 and modify the visualization 114 associated with the AR environment to couple (e.g., snap) the first virtual industrial automation device 1602 with the second virtual industrial automation device 1604 at one or more predetermined connection points.

In some embodiments, the head mounted device 106 may join the wire connections associated with the first industrial automation device 1602 and the second industrial automation device 1604 when coupling the first industrial automation device 1602 and the second industrial automation device 1604. Based on the connected wire connections, the head mounted device 106 may perform logic that associates the first industrial automation device 1602 with the second industrial automation device 1604. For example, after the head mounted device 106 detects a separate gesture command performed by the user 104 associated with a joint virtual industrial automation device, the head mounted device 106 may display one or more severance points or joints associated with the joint virtual industrial automation device in the visualization 114. The one or more severance points or joints may be associated with locations where the user 104 may decouple the wire connections between the first industrial automation device 1602 with the second industrial automation device 1604. As described above, after the head mounted device 106 detects that the user 104 has positioned the user's hands about a proper severance joint, the head mounted device 105 may separate the first industrial automation device 1602 from the second industrial automation device 1604 and the wire connections associated with each respective virtual device.

Similarly, referring back to block 1808 with regard to the separate feature, the head mounted device 106 may determine whether the command is valid by determining whether the user's hands are positioned about a line or a point of severance between the first virtual industrial automation device 1602 from the second virtual industrial automation device 1604 in a joint virtual industrial automation device. If the head mounted device 106 determines that the user's hands are position about a line or a point of severance, the head mounted device 106 may modify the visualization 114 to display an error message and/or recommendation at block 1810. If the head mounted device 106 determines that the user's hands are positioned about a line or point of severance, the head mounted device 106 may modify the visualization 114 to separate the first virtual industrial automation device 1602 from the second virtual industrial automation device 1604 at one or more predetermined disconnection points (block 1812).

Additionally, in some embodiments, the head mounted device 106 may detect voice commands issued by the user to provide similar interactions or additional interactions with the virtual industrial automation devices in the AR environment or with the AR environment itself. For example, the user 104 may say the voice command "separate," "snap," or the like. After the head mounted device detects the voice command, the head mounted device 106 may perform actions as described herein with respect to the corresponding gesture command (e.g., the separate gesture command or the snap gesture command).

Figure 19:
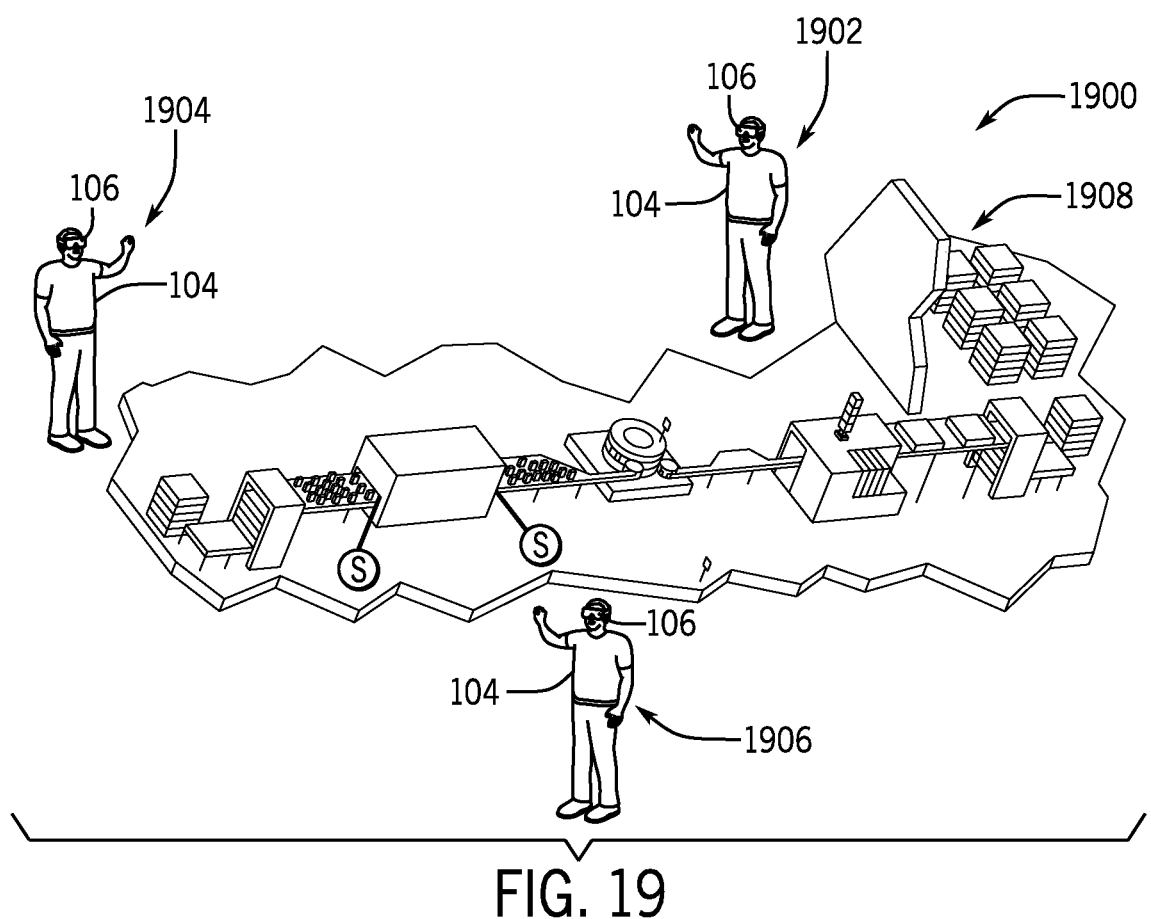
FIG. 19 is a perspective view of an exemplary visualization that may be perceived by a user utilizing the display device of FIG. 2 in a dynamic rotation mode, in accordance with an embodiment.

In some embodiments, the user 104 may wish to design an industrial system from a remote location away from the physical location that the industrial system may be located after assembly. For example, a user may design an industrial system from an office or in another country. In such embodiments, the head mounted device 106 may provide a dynamic rotation mode that facilitates the design of an industrial system in a virtual environment. To help illustrate, FIG. 19 is an illustration 1900 of the user 104 utilizing the head mounted device 106 to navigate a virtual industrial system 1908 in a virtual environment. The user 104 may view the virtual industrial system 1908 from in the virtual environment without physically moving. That is, the head mounted device 106 may detect various gesture commands (e.g., the gesture commands as describe herein) or voice commands that may cause the head mounted device 106 to modify the visualization of the virtual environment. For example, the user 104 may issue navigational voice commands (e.g., "turn left," "turn right," "forward," or "backward"). The head mounted device 106 may detect the navigational voice commands and modify the visualization of the virtual industrial system to provide the user 104 with a view 1902, 1904, 1906 corresponding to the actual view the user would have if the user performed those actions in a physical industrial system. Additionally, the user 104 may interact with the virtual industrial system 1908, and portions thereof (e.g., various virtual industrial devices) using other voice commands and gesture commands as described herein. That is, the user 104 may extend his hands to the edges or sides of the virtual industrial system 1908 and move the hands in a manner (e.g., circular motion) that rotates the virtual industrial system 1908. By way of example, the user 104 with the view 1902 may rotate the virtual industrial system 1908 180 degrees to obtain the view 1906 without moving from his position in the corresponding physical space.

Figure 20:
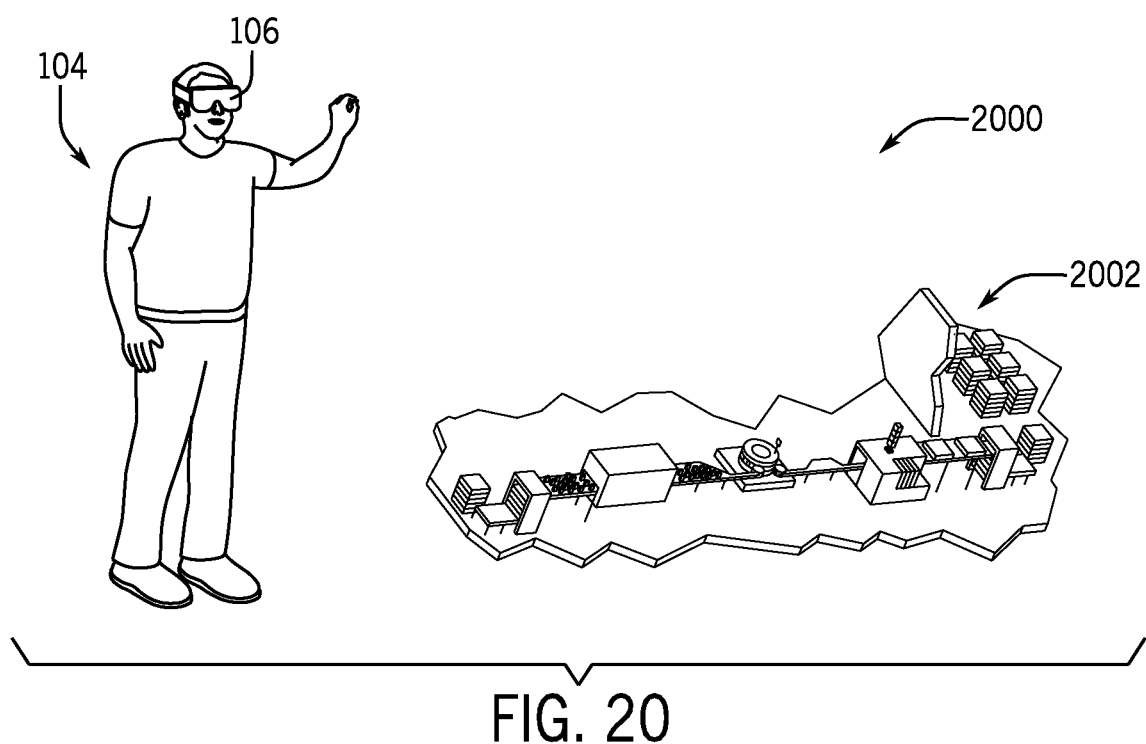
FIG. 20 is a perspective view of an exemplary visualization that may be perceived by a user utilizing the display device of FIG. 2 after performing a scale down command, in accordance with an embodiment.

In some embodiments, the user 104 may wish to have a bird's eye perspective of the design of an industrial system. As such, the head mounted device 106 may provide the user with a scale down command to reduce the size of the virtual system in the visualization. To help illustrate, FIG. 20 is a perspective view 2000 of a user 104 utilizing a head mounted device 106 to view a visualization of a virtual industrial automation device or a virtual industrial system 2002. The user may issue a voice command, such as "scale down," "smaller," or the like, to reduce the size of the virtual industrial automation device or the virtual industrial system 2002. In some embodiments, the user 104 may be able perform a scale up command to increase the size of the virtual industrial automation device or the virtual industrial automation device 2002 in the visualization. For example, after the user 104 has selected a virtual industrial automation device (e.g., via a gaze gesture command), the user may issue a voice command, such as "scale up," "larger," "grow," or the like, or scale gesture commands described above to modify the size of the virtual industrial automation device 1304.

Although certain embodiments as described herein refer to displaying or modifying a visualization that includes the user's surrounding, virtual objects, virtual information, or the like, on a display of, for example, the head mounted device 106, it should be understood that, in other embodiments, the display may be a transparent display allowing the user to see the user's surroundings through the display, and a visualization that includes the virtual objects, virtual information, or the like, may be superimposed on the transparent display to appear to the user as if the virtual objects are in the user's surroundings.

Technical effects of the present disclosure include techniques for facilitating the visualization and the design of an industrial system by a user in an AR environment. The interactive AR system may allow a user to visualize and model various configurations and designs of an industrial system and the components of the industrial system within the physical space the industrial system may be located after assembly. Additionally, the interactive AR system provide the user with various gesture commands and voice commands to interact with virtual objects within the AR environment and to navigate the AR environment itself using natural hand motions and gestures. In this way, operating in the AR environment may be more easily performed by various operators.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

What is claimed is:

1. A non-transitory computer-readable medium comprising computer-executable code that, when executed by at least one processor, causes the at least one processor to perform operations comprising:

detecting a user input indicative of a first movement of a first virtual industrial automation device toward a second virtual industrial automation device in an augmented reality environment presented via an electronic display;

determining a compatibility for the first virtual industrial automation device coupling to the second virtual industrial automation device; and generating a visualization comprising a first animation of the first virtual industrial automation device accelerating toward and coupling to the second virtual industrial automation device to create a joint virtual industrial automation device in response to determining that the first virtual industrial automation device is compatible with the second virtual industrial automation device.

2. The non-transitory computer-readable medium of claim 1, wherein the computer-executable code is configured to determine that the first virtual industrial automation device is compatible with the second virtual industrial automation device by:

receiving a first set of specification data associated with a first physical industrial automation device corresponding to the first virtual industrial automation device and a second set of specification data associated with a second physical industrial automation device corresponding to the second virtual industrial automation device; and determining that the first physical industrial automation device is configured to couple to the second physical industrial automation device based on the first set of specification data and the second set of specification data.

3. The non-transitory computer-readable medium of claim 1, wherein the computer-executable code is configured to perform the operations comprising:

detecting a second user input indicative of a decoupling of the joint virtual industrial automation device in the augmented reality environment;

determining that the second user input does not satisfy one or more conditions associated with the decoupling of the joint virtual industrial automation device; and generating a second visualization comprising an error notification, a recommendation to modify the second user input to satisfy the one or more conditions, or both in the augmented reality environment in response to the second user input not satisfying the one or more conditions.

4. The non-transitory computer-readable medium of claim 1, wherein the computer-executable code is configured to cause the at least one processor to perform the operations comprising:

detecting a second user input indicative of a decoupling of the joint virtual industrial automation device in the augmented reality environment;

determining that the second user input satisfies one or more conditions associated with the decoupling of the joint virtual industrial automation device; and generating a second visualization comprising a second animation of the first virtual industrial automation device decoupling from the second virtual industrial automation device in the augmented reality environment in response to determining that the second user input satisfies the one or more conditions.

5. The non-transitory computer-readable medium of claim 4, wherein the computer-executable code is configured to cause the at least one processor to perform the operations comprising generating a third visualization indicative of a severance location between the first virtual industrial automation device and the second virtual industrial automation device in the joint virtual industrial automation device in response to detecting the second user input.

6. The non-transitory computer-readable medium of claim 4, wherein the computer-executable code is configured to cause the at least one processor to perform the operations comprising sending a command to an audio device to produce a sound that corresponds to the first virtual industrial automation device coupling to the second virtual industrial automation device to create the joint virtual industrial automation device.

7. The non-transitory computer-readable medium of claim 6, wherein the sound comprises a pop sound, a click sound, a ring sound, or a chime sound.

8. A method, comprising:

detecting, via a processor, a user input indicative of a decoupling of a first virtual industrial automation device from a second virtual industrial automation device in an augmented reality environment presented via an electronic display;

generating, via the processor, a first visualization comprising the first virtual industrial automation device, the second virtual industrial automation device, and a severance location between the first virtual industrial automation device and the second virtual industrial automation device in the augmented reality environment;

determining, via the processor, that the user input satisfies one or more conditions associated with the severance location; and generating, via the processor, a second visualization comprising a first animation representative of the first virtual industrial automation device decoupling from the second virtual industrial automation device in the augmented reality environment in response to the user input satisfying the one or more conditions.

9. The method of claim 8, wherein the decoupling of the first virtual industrial automation device from the second virtual industrial automation device comprises the first virtual industrial automation device accelerating away from the second virtual industrial automation device in the augmented reality environment.

10. The method of claim 8, comprising:

before detecting the user input:

detecting a second user input indicative of the decoupling of the first virtual industrial automation device from the second virtual industrial automation device in the augmented reality environment; and determining that the second user input does not satisfy the one or more conditions associated with the decoupling of the first virtual industrial automation device from the second virtual industrial automation device.

11. The method of claim 10, comprising generating, via the processor, a third visualization comprising an error notification, a recommendation to modify the user input to satisfy the one or more conditions, or both, in the augmented reality environment in response to determining that the second user input does not satisfy the one or more conditions associated with the decoupling.

12. The method of claim 8, comprising:

detecting, via the processor, a second user input indicative of a first movement of the first virtual industrial automation device toward the second virtual industrial automation device in the augmented reality environment; and determining, via the processor, whether the first virtual industrial automation device is compatible with the second virtual industrial automation device.

13. The method of claim 12, comprising generating a third visualization comprising a second animation of the first virtual industrial automation device accelerating toward and coupling to the second virtual industrial automation device, a third animation of the second virtual industrial automation device accelerating toward and coupling to the first virtual industrial automation device, or both, to create a joint virtual industrial automation device in response to determining that the first virtual industrial automation device is compatible with the second virtual industrial automation device.

14. The method of claim 8, wherein the severance location corresponds to a wire connection between a first physical industrial automation device associated with the first virtual industrial automation device and a second physical industrial automation device associated with the second virtual industrial automation device.

15. A non-transitory, computer-readable medium comprising computer-executable code that, when executed by at least one processor, causes the at least one processor to perform operations comprising:
  detecting a user input indicative of a decoupling of a first virtual industrial automation device from a second virtual industrial automation device in an augmented reality environment;
  determine that the user input does not satisfy one or more conditions associated with the decoupling of the first virtual industrial automation device from the second virtual industrial automation device in the augmented reality environment; and
  generate a first visualization comprising an error notification, a recommendation to modify the user input to satisfy the one or more conditions, or both, in the augmented reality environment, wherein the error notification, the recommendation, or both, are displayed adjacent to the first virtual industrial automation device, the second virtual industrial automation device, or both.

16. The non-transitory, computer-readable medium of claim 15, wherein the computer-executable code is configured to cause the at least one processor to perform the operations comprising:
  detecting a second user input indicative of the decoupling of the first virtual industrial automation device from the second virtual industrial automation device in the augmented reality environment after generating the first visualization; and
  determining that the second user input satisfies the one or more conditions associated with the decoupling.

17. The non-transitory, computer-readable medium of claim 16, wherein the computer-executable code is configured to cause the at least one processor to perform the operations comprising generating a second visualization comprising an animation representative of the first virtual industrial automation device decoupling from the second virtual industrial automation device in the augmented reality environment.

18. The non-transitory, computer-readable medium of claim 15, wherein the computer-executable code is configured to cause the at least one processor to perform the operations comprising generating a second visualization comprising the first virtual industrial automation device, the second virtual industrial automation device, and a severance location between the first virtual industrial automation device and the second virtual industrial automation device in the augmented reality environment in response to detecting the user input.

19. The non-transitory, computer-readable medium of claim 15, wherein the computer-executable code is configured to cause the at least one processor to perform the operations comprising detecting a second user input indicative of a first movement of the first virtual industrial automation device toward the second virtual industrial automation device in the augmented reality environment.

20. The non-transitory, computer-readable medium of claim 19, wherein the computer-executable code is configured to cause the at least one processor to perform the operations comprising:
  determining a compatibility for the first virtual industrial automation device coupling to the second virtual industrial automation device; and
  generating a second visualization comprising a first animation of the first virtual industrial automation device accelerating toward and coupling to the second virtual industrial automation device to create a joint virtual industrial automation device in response to determining that the first virtual industrial automation device is compatible with the second virtual industrial automation device.

* * * * *